(12) United States Patent
Hirai

(10) Patent No.: US 8,054,366 B2
(45) Date of Patent: Nov. 8, 2011

(54) AUTO-FOCUSING OPTICAL APPARATUS WITH FOCUS DETECTION AREA SETTING CAPABILITY AND FOCUS DETECTION AREA CHANGING CAPABILITY

(75) Inventor: Keisuke Hirai, Tochigi (JP)

(73) Assignee: Canon Kabushiki Kaisha (JP)

( * ) Notice: Subject to any disclaimer, the term of this patent is extended or adjusted under 35 U.S.C. 154(b) by 203 days.

(21) Appl. No.: 12/178,439

(22) Filed: Jul. 23, 2008

(65) Prior Publication Data

US 2009/0028540 A1    Jan. 29, 2009

Related U.S. Application Data

(62) Division of application No. 10/807,815, filed on Mar. 23, 2004, now Pat. No. 7,417,683.

(30) Foreign Application Priority Data

Mar. 26, 2003  (JP) ................... 2003-085231
Mar. 27, 2003  (JP) ................... 2003-088477

(51) Int. Cl.
*H04N 5/222*  (2006.01)
*H04N 5/232*  (2006.01)
*G03B 13/00*  (2006.01)

(52) U.S. Cl. .................... 348/333.01; 348/350
(58) Field of Classification Search .................. None
See application file for complete search history.

(56) References Cited

U.S. PATENT DOCUMENTS

| | | | |
|---|---|---|---|
| 5,629,735 A * | 5/1997 | Kaneda et al. ........ 348/350 |
| 5,749,000 A | 5/1998 | Narisawa | |
| 5,808,678 A * | 9/1998 | Sakaegi ............ 348/333.03 |
| 6,088,060 A * | 7/2000 | Suda et al. ............ 348/350 |
| 6,522,360 B1 * | 2/2003 | Miyawaki et al. ...... 348/347 |
| 6,812,968 B1 | 11/2004 | Kermani | |
| 6,919,927 B1 * | 7/2005 | Hyodo ............ 348/333.02 |
| 7,034,881 B1 | 4/2006 | Hyodo et al. | |
| 7,230,648 B2 * | 6/2007 | Ueno ............... 348/340 |
| 7,262,803 B2 | 8/2007 | Hirai | |
| 2003/0076429 A1 | 4/2003 | Karasaki et al. | |
| 2003/0076437 A1 | 4/2003 | Karasaki et al. | |
| 2003/0142880 A1 | 7/2003 | Hyodo | |

FOREIGN PATENT DOCUMENTS

| | | |
|---|---|---|
| JP | 07-168084 A | 7/1995 |
| JP | 2000-206402 A | 7/2000 |
| JP | 2001-201679 A | 7/2001 |

* cited by examiner

*Primary Examiner* — Justin P Misleh

(74) *Attorney, Agent, or Firm* — Rossi, Kimms & McDowell LLP

(57) ABSTRACT

An optical apparatus is disclosed, with which focus detection areas of different size and/or position can be stored. The optical apparatus includes a first operating member which is operated changing at least one of a size and a position of a focus detection area, a memory storing a plurality of focus detection areas which differ from each other in at least one of size and position, a second operating member which is operated for setting one of the plurality of stored focus detection areas as a to-be-used focus detection area for detection of the focus state of an image-taking optical system. The apparatus further includes a controller performing storage and setting processes of the focus detection areas and a focusing control of the image-taking optical system.

3 Claims, 32 Drawing Sheets

AUTO-FOCUSING OPTICAL APPARATUS WITH FOCUS DETECTION AREA SETTING CAPABILITY AND FOCUS DETECTION AREA CHANGING CAPABILITY

CROSS REFERENCE TO RELATED APPLICATIONS

This is a divisional of U.S. application Ser. No. 10/807,815, filed Mar. 23, 2004, now issued as U.S. Pat. No. 7,417,683, which is hereby incorporated by reference in its entirety.

BACKGROUND OF THE INVENTION

1. Field of the Invention

The present invention relates to optical apparatuses, such as video lenses, video cameras, TV lenses or TV cameras, equipped with an auto-focusing (AF) function.

2. Description of Related Art

Optical apparatuses equipped with an AF function are known in which a signal corresponding to the sharpness (contrast state) of an object image is extracted from an image-pickup signal (video image) and evaluated to perform a focus adjustment operation with an image-taking optical system.

FIG. 33 is a block diagram showing the structure of a conventional optical apparatus. In this figure, reference numeral 201 denotes the optical apparatus, reference numeral 202 denotes a focus lens constituting an image-taking optical system, reference numeral 203 denotes a CCD (image-pickup device) which converts input optical signals into electrical signals and outputs them as video signals, reference numeral 204 denotes a video signal processing section which processes video signals output from the CCD 203, reference numeral 205 denotes an AF evaluation section which generates an AF evaluation value signal representing a sharpness, based on the processed video signal, reference numeral 206 denotes a CPU which controls a motor 207 driving the focus lens 202 based on the AF evaluation value signal from the AF evaluation section 205. Numeral 208 denotes a lens position detection section which detects the position of the focus lens 202 and inputs the current position of the focus lens 202 as a feedback signal to the CPU 206.

The light passing through the focus lens 202 forms an image on an image-pickup surface of the CCD 203, and is converted by the CCD 203 into video signals. The video signal processing section 204 processes the video signal from the CCD 203 with a filter or the like, and optimizes the video signal. The AF evaluation section 205 generates an AF evaluation value signal representing the sharpness of the object image from the video signal obtained within a focus detection area which is set at a center of an image-taking area.

Here, since the focus detection area is set to the center of the image-taking area, the image-taking optical system is focused on the object positioned at the center of the image-taking area. Being mechanically connected to the focus lens 202, the lens position detection section 208 detects the position of the focus lens 202, and inputs a position feedback signal into the CPU 206. Based on the AF evaluation value signal from the AF evaluation section 205 and the position feedback signal obtained from the lens position detection section 208, the CPU 206 calculates the driving quantity of the focus lens 202, and inputs a driving command signal into the motor 207. The motor 207 is operated with this driving command signal, and drives the focus lens 202. Thus, a focusing process towards the object is carried out.

However, in this conventional example, the position of the focus detection area is fixed to the central area of the image-taking area, and also the size of the focus detection area is fixed. Therefore, if the size of the object in the image-taking is not of a suitable size compared to this fixed focus detection area, or if it is necessary to perform image-taking such that the object is positioned outside the central area in the image-taking area, then it is not possible to perform an adequate focusing process.

SUMMARY OF THE INVENTION

It is an object of the present invention to provide an optical apparatus with which size and position of a focus detection area can be changed, and with which the changed focus detection area can be stored.

In accordance with one aspect of the present invention, an optical apparatus comprises a focus detection unit detecting a focus state of an image-taking optical system with respect to an object included in a focus detection area; a first operating member which is operated for changing at least one of a size and a position of the focus detection area; a memory storing a plurality of focus detection areas which differ from each other in at least one of size and position; and a controller performing a storage process of storing the plurality of focus detection areas into the memory and a setting process of setting, from the stored plurality of focus detection areas, a focus detection area used for detection of the focus state.

These and further objects and features of the optical apparatus of the present invention will become apparent from the following detailed description of preferred embodiments thereof taken in conjunction with the accompanying drawings.

DETAILED DESCRIPTION OF THE PREFERRED EMBODIMENTS

The following is a description of preferred embodiments of the present invention, with reference to the accompanying drawings.

Embodiment 1

Figure 1:
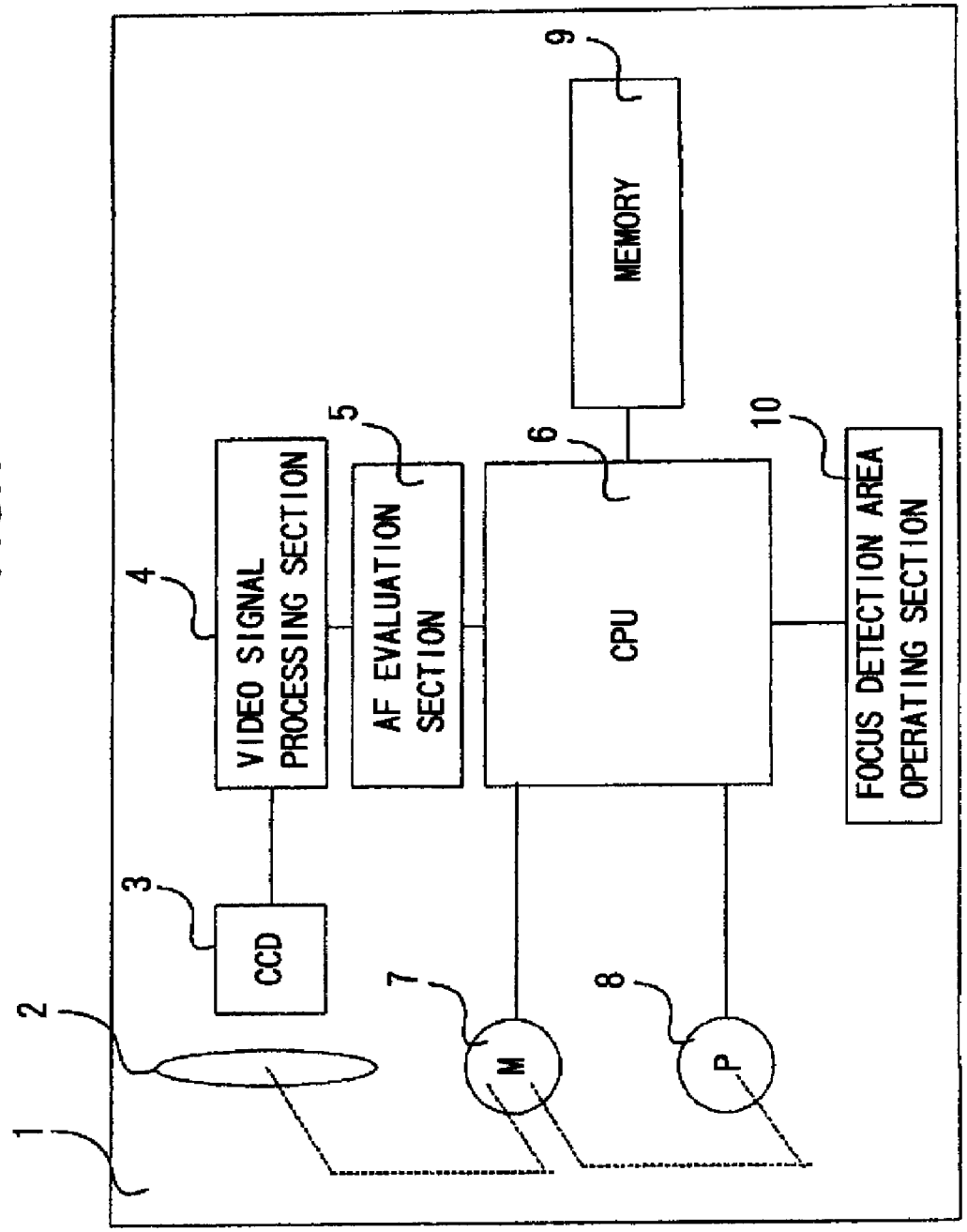
FIG. 1 is a block diagram showing the structure of an optical apparatus according to Embodiment 1.

An embodiment of the present invention is explained with reference to FIGS. 1 to 5. FIG. 1 is a block diagram showing the structure of an optical apparatus, such as a video lens, a video camera, a TV lens or a TV camera according to this embodiment.

In FIG. 1, reference numeral 1 denotes the optical apparatus, reference numeral 2 denotes a focus lens constituting an image-taking optical system, and reference numeral 3 denotes an image-pickup device (a CCD sensor in FIG. 1), such as a CCD sensor or CMOS sensor, which converts an input optical signal (such as the object image formed by the image-taking optical system) into an electrical signal and outputs it as a video signal.

Reference numeral 4 denotes a video signal processing section which processes video signals output from the image-pickup device 3, reference numeral 5 denotes an AF evaluation section serving as a focus detection unit which generates an AF evaluation value signal representing the sharpness (contrast state) of the object image based on the processed video signal and outputs it. Reference numeral 6 denotes a CPU serving as a controller, which calculates a driving quantity of the focus lens 2 based on the AF evaluation value signal from the AF evaluation section 5, and controls the motor 7 driving the focus lens 2.

Reference numeral 8 denotes a lens position detection section which detects the position of the focus lens 2, and inputs a feedback signal indicating the current position of the focus lens 2 into the CPU 6. Here, the light passing through the focus lens 2 is imaged onto the image-pickup surface of the image-pickup device 3, and converted by the image-pickup device 3 into a video signal. The video signal processing section 4 processes the video signal from the image-pickup device 3 with a filter or the like, and optimizes the video signal. The AF evaluation section 5 generates an AF evaluation value signal representing the sharpness of the object image from the video signal components obtained in a focus detection area within an image-taking area. The CPU 6 controls the motor 7 and drives the focus lens 2 for predetermined amounts at a time, such the AF evaluation value signal reaches a predetermined level (a level near the maximum of the AF evaluation value signal obtained in that vicinity), that is, such that the image-taking optical system becomes focused on the object within the focus detection area. This AF technique is referred to as "contrast detection technique," "hill-climbing technique" or "TV-AF technique."

Reference numeral 9 denotes a rewritable memory which stores focus detection areas, for example. Reference numeral 10 denotes a focus detection area operating section made of a plurality of operating switches.

Figure 2:
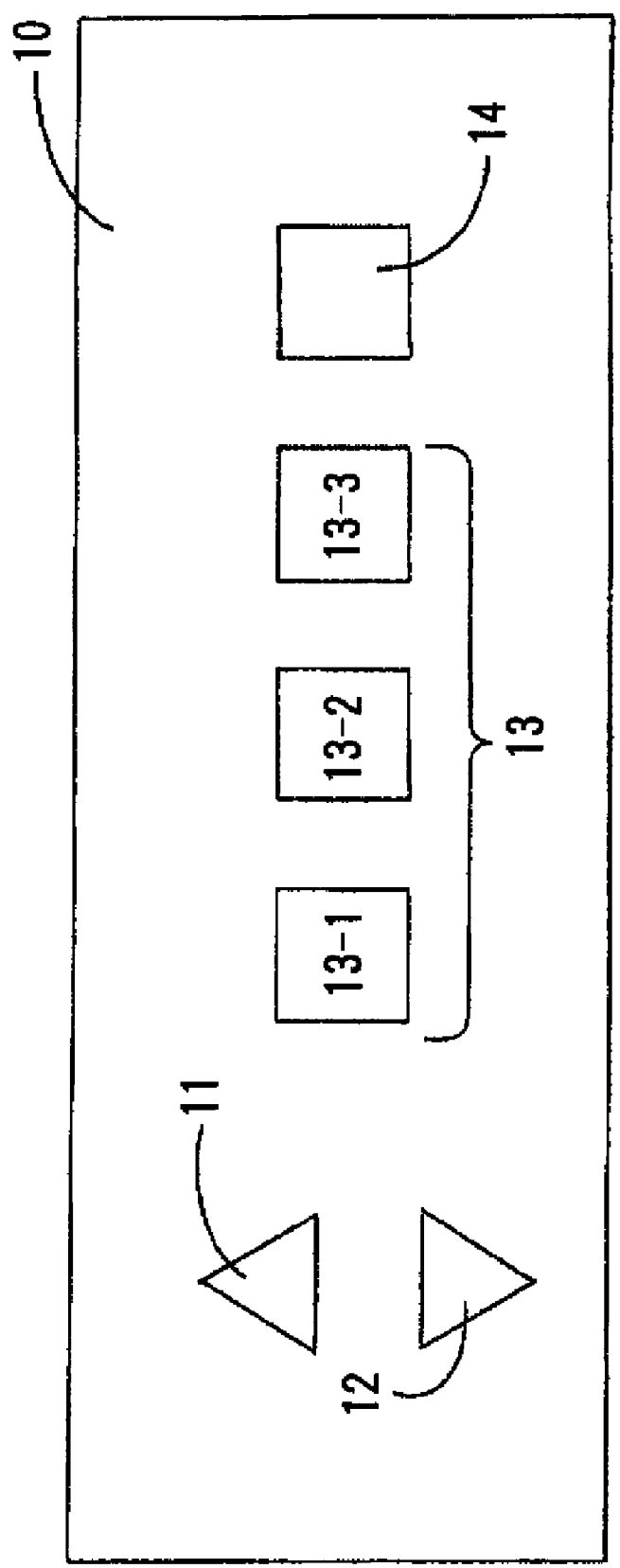
FIG. 2 is a block diagram showing the structure of a focus detection area operating section provided in the optical apparatus according to Embodiment 1.

FIG. 2 is a diagram showing the arrangement of the operating switches in the focus detection area operating section 10 of FIG. 1. In FIG. 2, reference numerals 11 and 12 denote size setting switches serving as first operating members for selecting the size of the focus detection area, and they are an expansion switch and a contraction switch, respectively.

Reference numeral 13 denotes an area selection switch group serving as a second operating member, which is made of a total of three switches 13-1, 13-2 and 13-3. Reference numeral 14 is an area determination switch.

The processing performed by the CPU 6 can be divided into a focus detection area storage process and a focus detection area switching process.

First, using FIGS. 1 and 2, the procedural flow of the storage process is explained for the various blocks. The state of the operating switches in FIG. 2 is monitored by the CPU 6. Turning on one of the operating switches, a corresponding process is executed by the CPU 6.

While the size setting switches 11 and 12 are on, the CPU 6 changes the size of the focus detection area in the direction corresponding to the operated switch (that is, expanding or contracting the focus detection area). And by operating one of the switches 13-1, 13-2 and 13-3 from the area selection switch group 13 while the area determination switch 14 is on, the size of the focus detection area can be assigned to the operated area selection switch and stored in the memory 9. That is to say, in this embodiment, focus detection areas of three different sizes can be stored.

Figure 3:
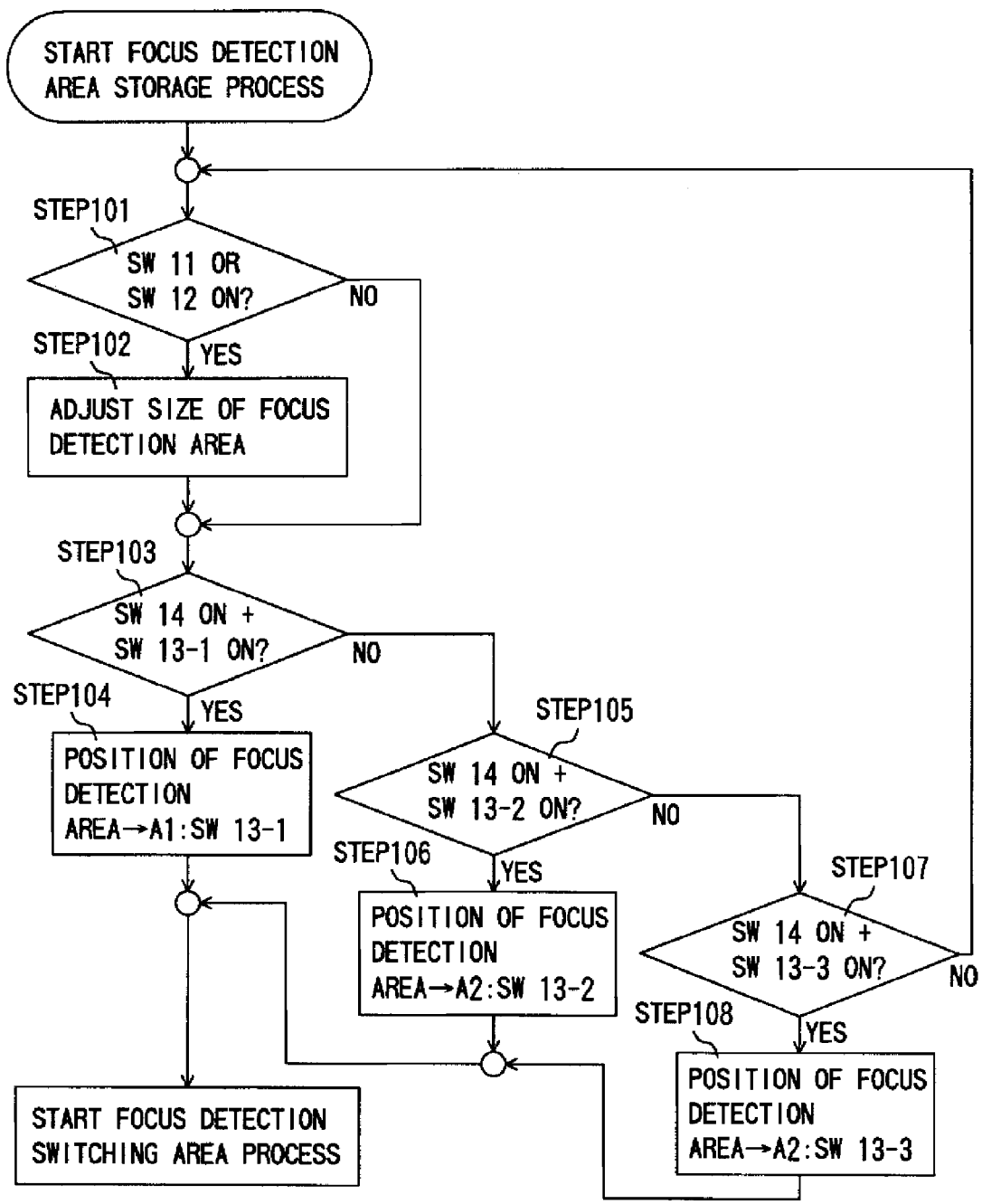
FIG. 3 is a flowchart showing the focus detection area storage process in Embodiment 1.

FIG. 3 is a flowchart showing the procedure for the process of storing a focus detection area, which is executed by the CPU 6 in this embodiment.

At step 101 in FIG. 3, if one of the size setting switches 11 or 12 is on, then the procedure advances to step 102, where the size of the focus detection area is changed in the direction corresponding to the operated switch (that is, in an expanding or contracting direction).

If neither of the size setting switches 11 and 12 is on at step 101, then the procedure advances to step 103 without changing the size of the focus detection area.

Then, at step 103, if the area selection switch 13-1 is turned on while the area determination switch 14 is on, the procedure advances to step 104, and taking the size of the focus detection area at this time as the focus detection area A1, it is assigned to the area selection switch 13-1, and this is stored in the memory 9.

If, at step 103, the area selection switch 13-1 is not turned on while the area determination switch 14 is on, then the procedure advances to step 105. At step 105, if the area selection switch 13-2 is turned on while the area determination switch 14 is on, the procedure advances to step 106. At step 106, taking the size of the focus detection area at this time as the focus detection area A2, it is assigned to the area selection switch 13-2, and this is stored in the memory 9.

If, at step 105, the area selection switch 13-2 is not turned on while the area determination switch 14 is on, then the procedure advances to step 107. At step 107, if the area selection switch 13-3 is turned on while the area determination switch 14 is on, the procedure advances to step 108. At step 108, taking the size of the focus detection area at this time as the focus detection area A3, it is assigned to the area selection switch 13-3, and this is stored in the memory 9.

If, at step 107, the area selection switch 13-3 is not turned on while the area determination switch 14 is on, then the procedure returns to step 101. Moreover, after step 104, step 106 and step 108, the procedure advances to a focus detection area switching process, which is explained later.

It should be noted that it is presumed that in the storage process in FIG. 3, the focus detection area switching function of the area selection switch group 13 is deactivated.

Referring to FIGS. 1 and 2, the following is an explanation of the process flow of the focus detection area switching procedure for the various blocks. While all area selection switches 13 are turned off when taking images, an AF evaluation value signal is generated in the AF evaluation section 5, based on the video signal components obtained within the focus detection area (initial area: for example the center of the image-taking area) stored in advance in the memory 9. Based on the sharpness of this AF evaluation value signal and the position information of the focus lens 2 obtained with the lens position detection section 8, the CPU 6 calculates a driving quantity for the focus lens 2. The motor 7 drives the focus lens 2 in accordance with this calculated driving quantity, performing a focusing process.

Similarly, while any of the switches in the area selection switch group 13 is turned on, a focusing process as explained above is carried out using the video signal components obtained in the focus detection areas assigned in advance to the switches of the area selection switch group 13 and stored in the memory 9.

Figure 4:
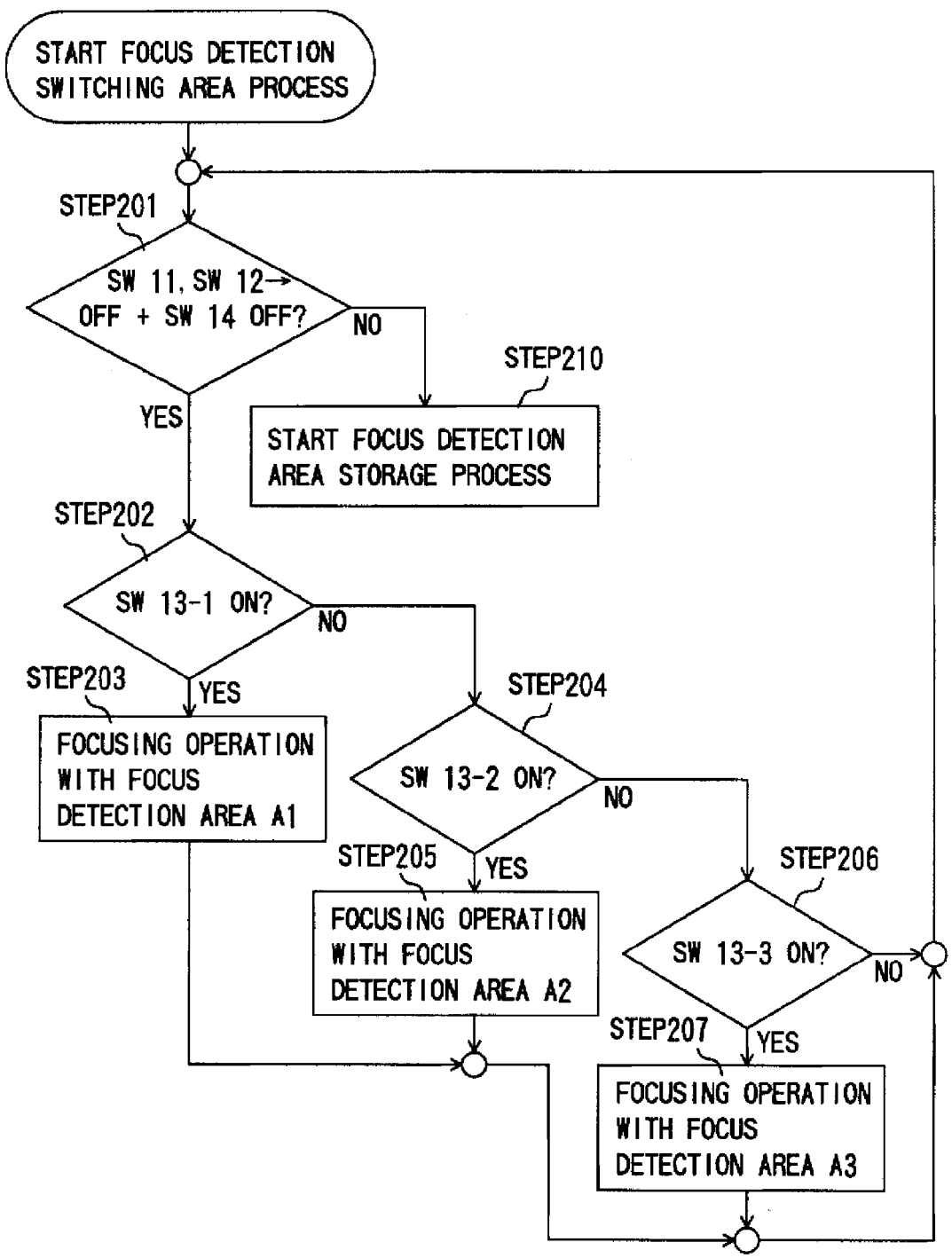
FIG. 4 is a flowchart showing the focus detection area switching process in Embodiment 1.

FIG. 4 is a flowchart showing the procedure of the process which the CPU 6 carries out when the focus detection area operating section 10 is operated. In FIG. 4, at step 201, if the area determination switch 14 is off and both of the size setting switches 11 and 12 are off, then the procedure advances to step 202. If, at step 201, the size setting switch 11 or 12 is on or the area determination switch 14 is on, then the focus detection area storage process shown in FIG. 3 (step 210) begins.

If, at step 202, the area selection switch 13-1 is on, then the procedure advances to step 203, and a focusing process is carried out with respect to the focus detection area A1 which has been previously stored in the memory 9. If, at step 202, the area selection switch 13-1 is not on, then the procedure advances to step 204. If, at step 204, the area selection switch 13-2 is on, then the procedure advances to step 205, and a focusing process is carried out with respect to the focus detection area A2 which has been previously stored in the memory 9.

If, at step 204, the area selection switch 13-2 is not on, then the procedure advances to step 206. If, at step 206, the area selection switch 13-3 is on, then the procedure advances to step 207, and a focusing process is carried out with respect to the focus detection area A3 which has been previously stored in the memory 9. If, at step 206, the area selection switch 13-3 is not on as well as following steps 203, 205 and 207, the procedure returns to step 201, and a focusing process is carried out in accordance with the same procedure.

Figure 5:
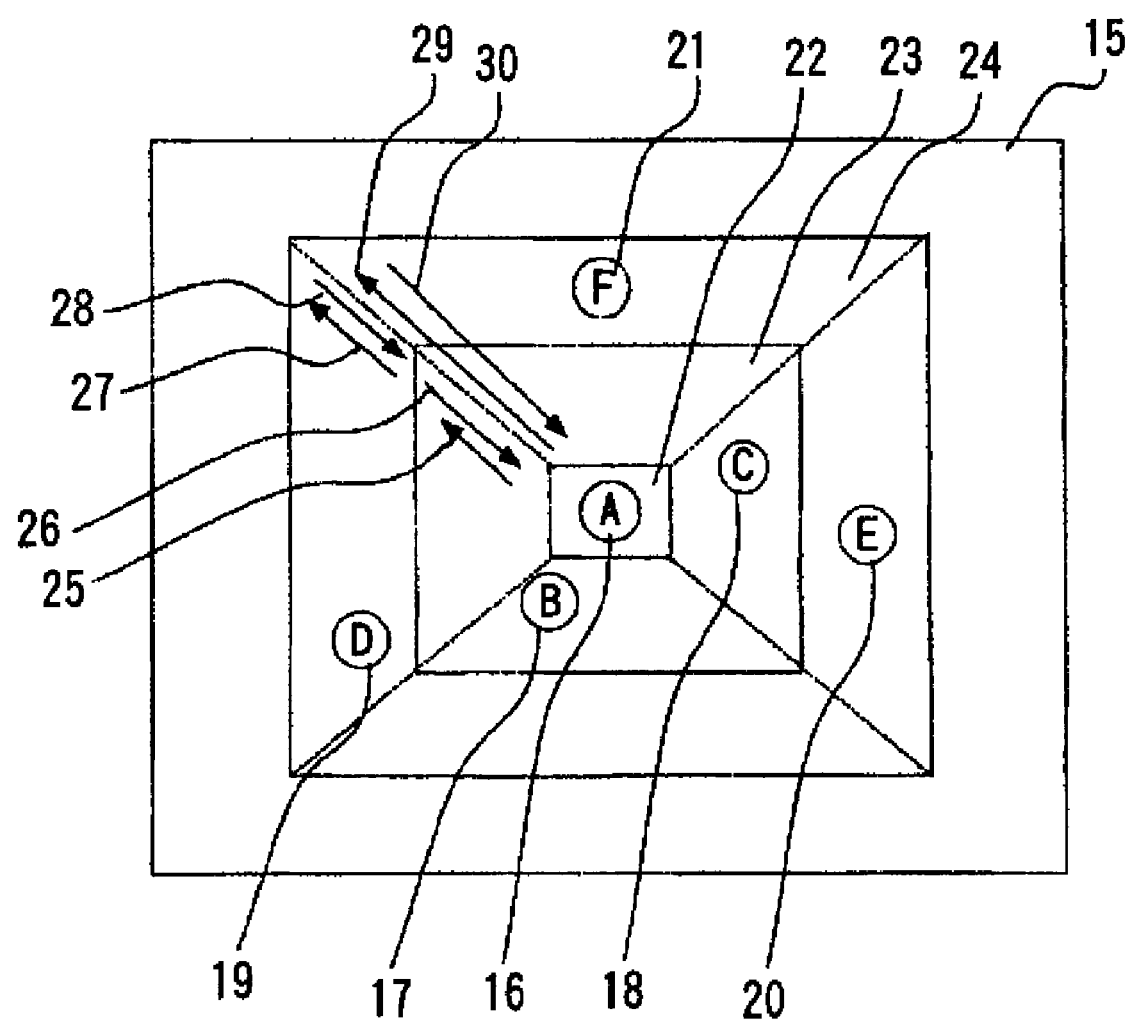
FIG. 5 is a diagram illustrating the focus detection area switching operation in Embodiment 1.

FIG. 5 is a diagram showing how the focus detection area is switched when operating the area selection switches 13 while taking images. In FIG. 5, reference numeral 15 denotes the image-taking area. Reference numeral 16 denotes an object A, reference numeral 17 denotes an object B, reference numeral 18 denotes an object C, reference numeral 19 denotes an object D, reference numeral 20 denotes an object E, and reference numeral 21 denotes an object F. Moreover, reference numeral 22 denotes a focus detection area A1, which has such a size that the image-taking optical system can be focused onto the object A16. Reference numeral 23 denotes a focus detection area A2, which has such a size that the object B17 and the object C18 can be focused. Reference numeral 24 denotes a focus detection area A3, which has such a size that the object D19, the object E20 and the object F21 can be focused.

Reference numeral 25 denotes a direction in which the focus detection area is switched when the area selection switch 13-2 is turned on while the focus detection area A1 has been set. Reference numeral 26 denotes a direction in which the focus detection area is switched when the area selection switch 13-1 is turned on while the focus detection area A2 has been set. Reference numeral 27 denotes a direction in which the focus detection area is switched when the area selection switch 13-3 is turned on while the focus detection area A2 has been set. Reference numeral 28 denotes a direction in which the focus detection area is switched when the area selection switch 13-2 is turned on while the focus detection area A3 has been set. Reference numeral 29 denotes a direction in which the focus detection area is switched when the area selection switch 13-3 is turned on while the focus detection area A1 has been set. Reference numeral 30 denotes a direction in which the focus detection area is switched when the area selection switch 13-1 is turned on while the focus detection area A3 has been set.

The size of the focus detection area (initial area) after power-on may be set to the size of the focus detection area A1, the focus detection area A2 or the focus detection area A3 assigned in the focus detection area storage process.

Thus, by assigning suitable sizes of the focus detection area to the area selection switches 13-1, -2, and -3, and storing these focus detection area sizes in the memory 9, it is easy to set three focus detection areas of different sizes during image-taking.

It should be noted that in this embodiment, there are three area selection switches 13, but the number of those switches is not limited to three, and may be n (where n is a natural number). Moreover, in this embodiment, the focusing process continues constantly while the area selection switches 13 are on, but it is also possible to fix the focus lens 2 after performing the focusing process once.

With the above-described structure, the operator can store focus detection areas of any size in advance in the memory 9 before image-taking, and can switch the size of the focus detection area by a simple operation during image-taking. As a result, it becomes possible to quickly switch the size of the focus detection area, and it is possible to concentrate on other image-taking controls during the time which has thus been saved.

Embodiment 2

Referring to FIGS. 6 to 9, the following is an explanation of Embodiment 2 of the present invention. The structure of an optical apparatus of this embodiment is similar to that of Embodiment 1 as shown in FIG. 1, so that structural elements common to both are denoted by the same numerals as in FIG. 1.

Figure 6:
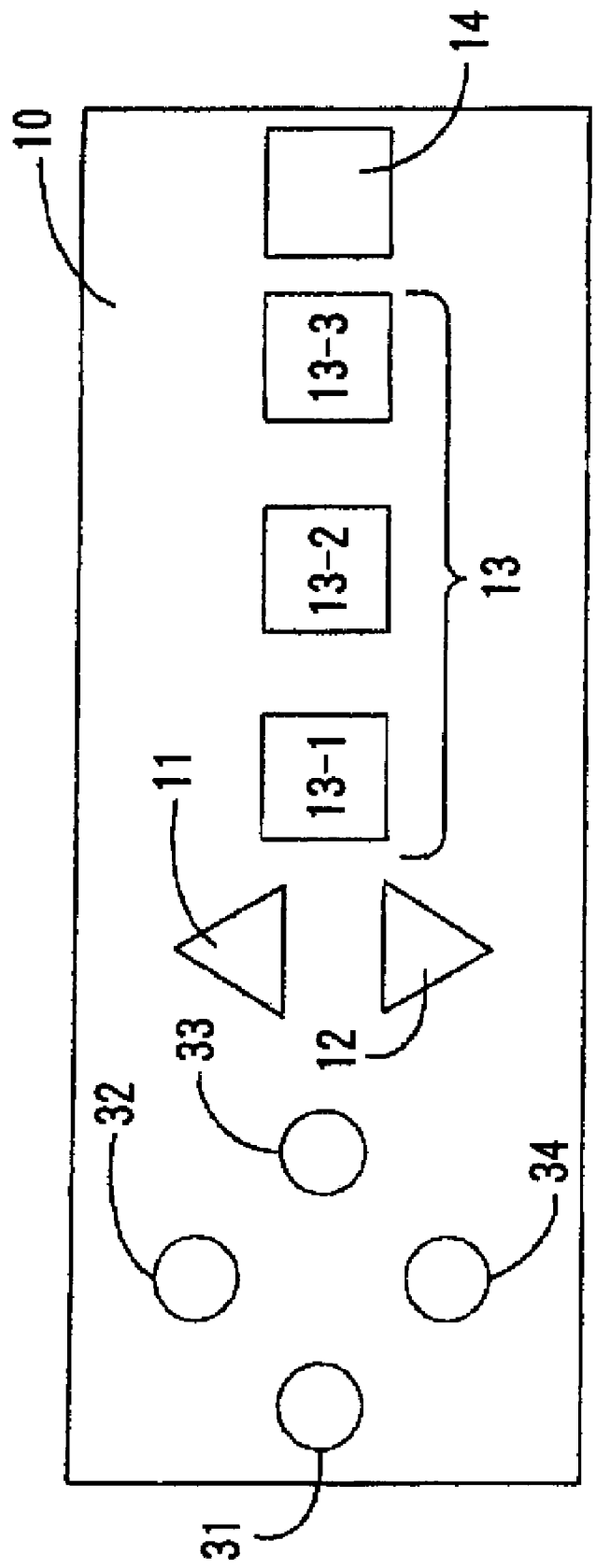
FIG. 6 is a block diagram showing the structure of a focus detection area operating section provided in the optical apparatus according to Embodiment 2.

FIG. 6 is a diagram showing the arrangement of the focus detection area operating section replacing the focus detection area operating section 10 in FIG. 1. Reference numerals 10 to 14 denote switches having the same function as in Embodiment 1. Reference numerals 31 to 34 denote area shifting switches serving as a first operating member for shifting the focus detection area, and include a left-shift switch 31, an upward-switch shift 32, a right-shift switch 33 and a downward-shift switch 34.

The processing performed by the CPU 6 can be divided into a focus detection area storage process and a focus detection area switching process. First, using FIGS. 1 and 6, the process flow of the storage process is explained for the various blocks.

The state of the operating switches in FIG. 6 is monitored by the CPU 6. Turning on one of the operating switches, a corresponding process is executed by the CPU 6. The process performed when the size setting switches 11 and 12 are turned on is the same as in Embodiment 1. When the area shifting switches 31 to 34 are turned on, the CPU 6 shifts the focus detection area within the image-taking area in a direction corresponding to the switch which has been turned on.

And while the area determination switch 14 is on, the size and the position of the focus detection area can be assigned to the operated area selection switch 13 and stored in the memory 9 by turning on one of the switches 13. That is to say, in this embodiment, three focus detection areas differing in at least one of size and position can be stored.

Figure 7:
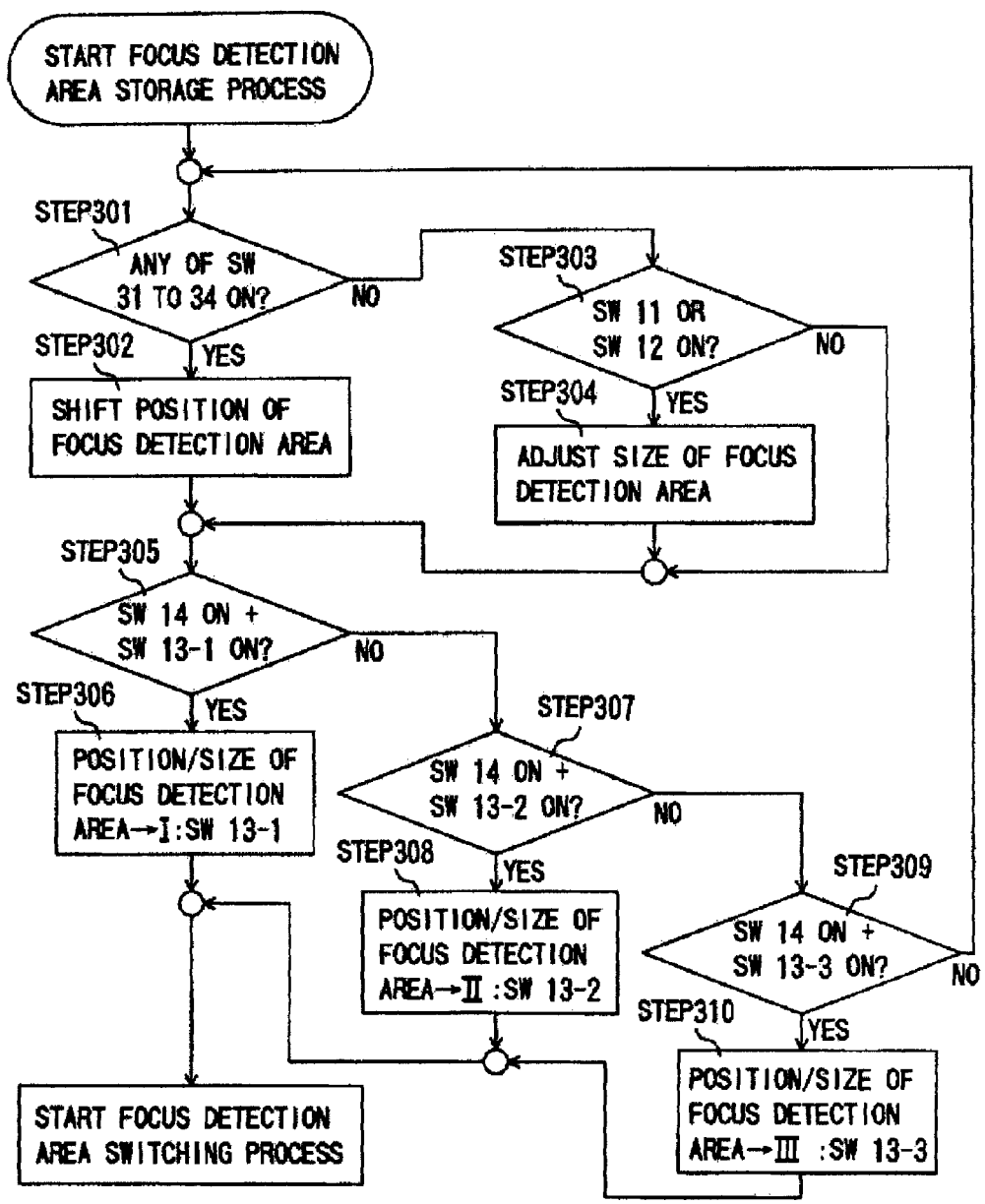
FIG. 7 is a flowchart showing the focus detection area storage process in Embodiment 2.

FIG. 7 is a flowchart showing the procedure for the process of storing the focus detection area executed by the CPU 6 in this embodiment. In FIG. 7, if any one of the area shifting switches 31 to 34 is on at step 301, then the procedure advances to step 302, and the focus detection area is shifted in the direction corresponding to the switch which is on.

If none of the area shifting switches 31 to 34 is on at step 301, then the procedure advances to step 303 without changing the position of the focus detection area.

At step 303, if one of the size setting switches 11 or 12 is on, then the procedure advances to step 304, where the size of the focus detection area is changed in the direction corresponding to the operated switch (that is, in expanding or contracting direction).

After the processing of step 302 and 304 as well as if neither of the size setting switches 11 and 12 is on at step 303, the procedure advances to step 305. Then, at step 305, if the area selection switch 13-1 is turned on while the area determination switch 14 is on, the procedure advances to step 306, and taking the position and size of the focus detection area at this time as the focus detection area I, it is assigned to the area selection switch 13-1, and this is stored in the memory 9.

If, at step 305, the area selection switch 13-1 is not turned on while the area determination switch 14 is on, then the procedure advances to step 307. At step 307, if the area selection switch 13-2 is turned on while the area determination switch 14 is on, the procedure advances to step 308, and taking the position and size of the focus detection area at this time as the focus detection area II, it is assigned to the area selection switch 13-2, and this is stored in the memory 9.

If, at step 307, the area selection switch 13-2 is not turned on while the area determination switch 14 is on, then the procedure advances to step 309. At step 309, if the area selection switch 13-3 is turned on while the area determination switch 14 is on, the procedure advances to step 310, and taking the position and size of the focus detection area at this time as the focus detection area III, it is assigned to the area selection switch 13-3, and this is stored in the memory 9.

If, at step 309, the area selection switch 13-3 is not turned on while the area determination switch 14 is on, then the procedure returns to step 301. After steps 306, 308 and 310, the procedure advances to a focus detection area switching process, which is explained later. It should be noted that it is presumed that in the storage process in FIG. 7, the focus detection area switching function of the area selection switch group 13 is deactivated.

The procedure of the focus detection area switching process is similar to that in Embodiment 1 (FIG. 4).

Figure 8:
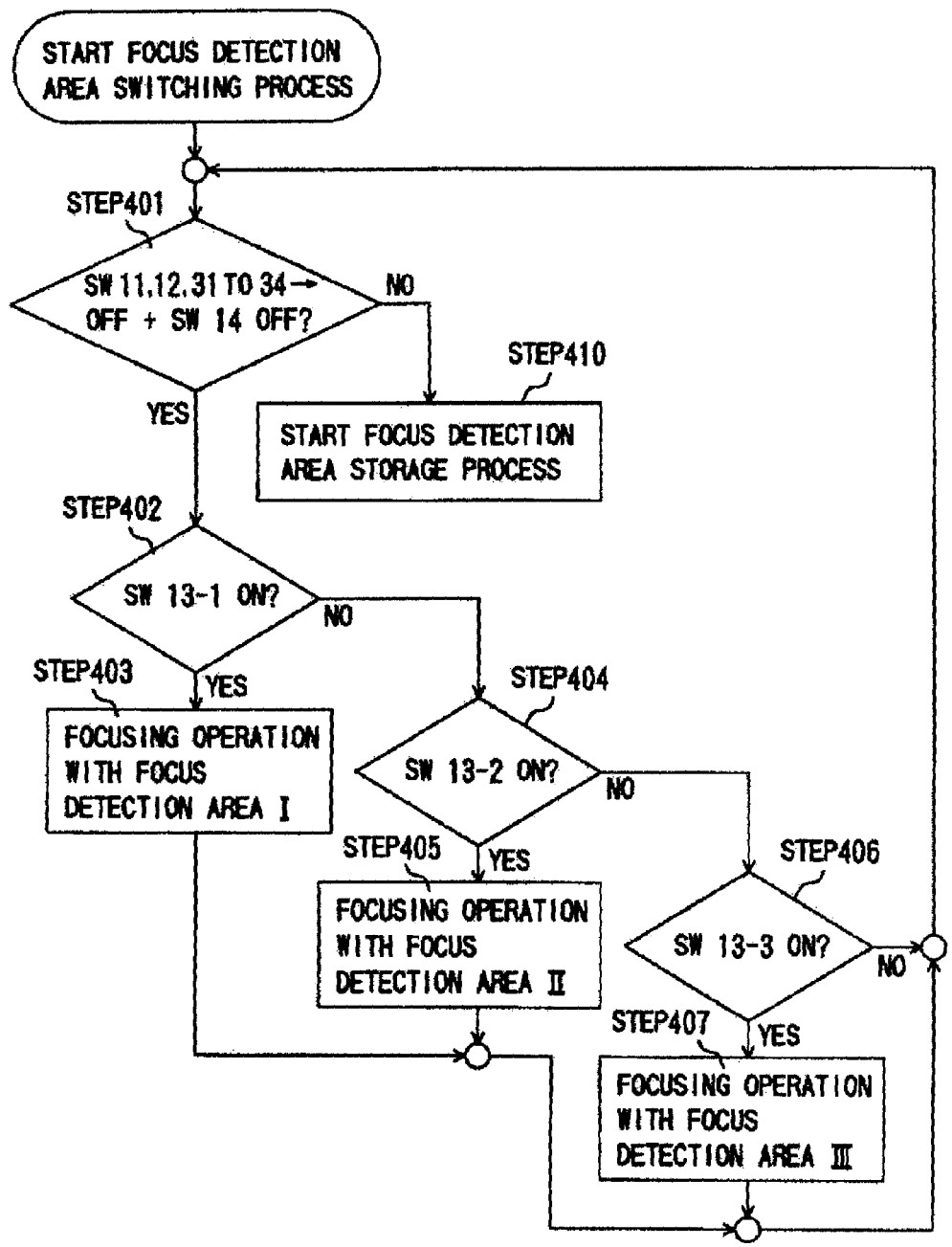
FIG. 8 is a flowchart showing the focus detection area switching process in Embodiment 2.

FIG. 8 is a flowchart showing the procedure of the process carried out by the CPU 6 when the focus detection area operating section 10 is operated. In FIG. 8, steps 402, 404 and 406 perform similar processing as steps 202, 204 and 206 in Embodiment 1, so that they are not explained further.

If, at step 401, the size setting switches 11 and 12, the area shifting switches 31 to 34 and the area determination switch 14 are all turned off, then the procedure advances to step 402. If, at step 401, the size setting switch 11 or 12, or one of the area shifting switches 31 to 34 or the area determination switch 14 is on, then the procedure advances to the focus detection area storage process (step 410).

At step 403, a focusing process is performed in the focus detection area I stored in advance in the memory 9, at step 405, a focusing process is performed in the focus detection area II stored in advance in the memory 9, and at step 407, a focusing process is performed in the focus detection area III stored in advance in the memory 9.

Following step 403, step 405 or step 407, the procedure returns to step 401, and a focusing process is carried out in accordance with the same procedure.

Figure 9:
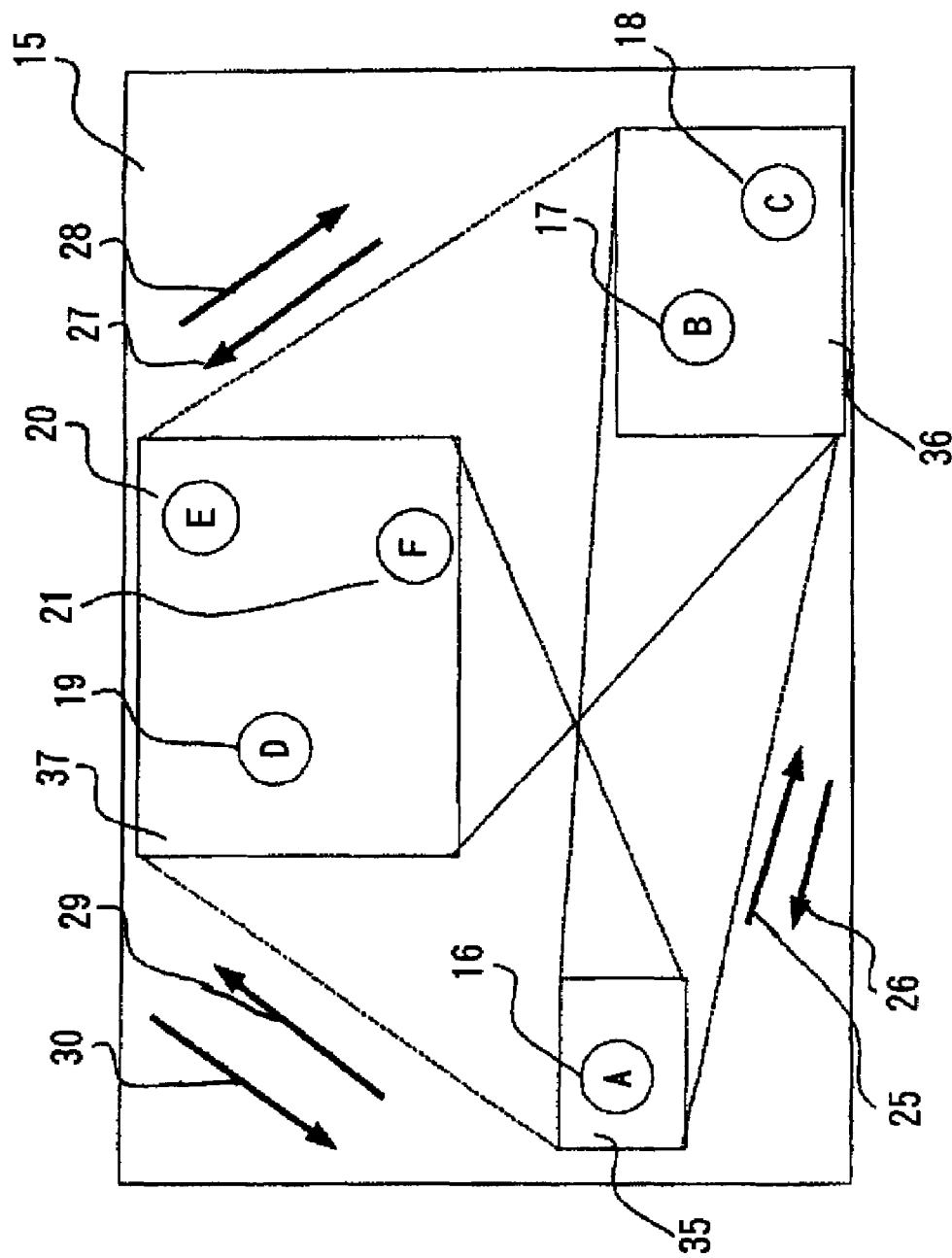
FIG. 9 is a diagram illustrating the focus detection area switching operation in Embodiment 2.

FIG. 9 is a diagram showing how the focus detection area is switched when operating the area selection switches 13 while taking images. In FIG. 9, reference numeral 35 denotes a focus detection area I, which has such a size and position that the image-taking optical system can be focused onto the object A16. Reference numeral 36 denotes a focus detection area II, which has such a size and position that the object B17 and the object C18 can be focused. Reference numeral 37 denotes a focus detection area III, which has such a size and position that the object D19, the object E20 and the object F21 can be focused.

Reference numeral 25 denotes a direction in which the focus detection area is switched when the area selection switch 13-2 is turned on while the focus detection area I has been set. Reference numeral 26 denotes a direction in which the focus detection area is switched when the area selection switch 13-1 is turned on while the focus detection area II has been set. Reference numeral 27 denotes a direction in which the focus detection area is switched when the area selection switch 13-3 is turned on while the focus detection area II has been set. Reference numeral 28 denotes a direction in which the focus detection area is switched when the area selection switch 13-2 is turned on while the focus detection area III has been set. Reference numeral 29 denotes a direction in which the focus detection area is switched when the area selection switch 13-3 is turned on while the focus detection area I has been set. Reference numeral 30 denotes a direction in which the focus detection area is switched when the area selection switch 13-1 is turned on while the focus detection area III has been set.

The size and position of the focus detection area (initial area) after power-on may be set to the size and position of the focus detection area I, the focus detection area II or the focus detection area III assigned in the focus detection area storage process.

Thus, by assigning suitable sizes and positions of the focus detection area to the area selection switches 13-1, -2, and -3, and storing these focus detection area sizes and positions in the memory 9, it is easy to set three focus detection areas which differ from each other in at least one of size and position.

It should be noted that in this embodiment, there are three area selection switches 13, but the number of those switches is not limited to three, and may be n (where n is a natural number). Moreover, in this embodiment, the focusing process continues constantly while the area selection switches 13 are on, but it is also possible to fix the focus lens 2 after performing the focusing process once.

With the above-described structure, the operator can store focus detection areas of any size and position in advance in the memory 9 before image-taking, and can switch the size and/or position of the focus detection area by a simple operation during image-taking. As a result, it becomes possible to quickly switch the focus detection area, and it is possible to concentrate on other image-taking controls.

Embodiment 3

Referring to FIGS. 10 to 13, the following is an explanation of Embodiment 3 of the present invention. The structure of an optical apparatus of this embodiment is similar to that of Embodiment 1 as shown in FIG. 1, so that structural elements common to both are denoted by the same numerals as in FIG. 1.

Figure 10:
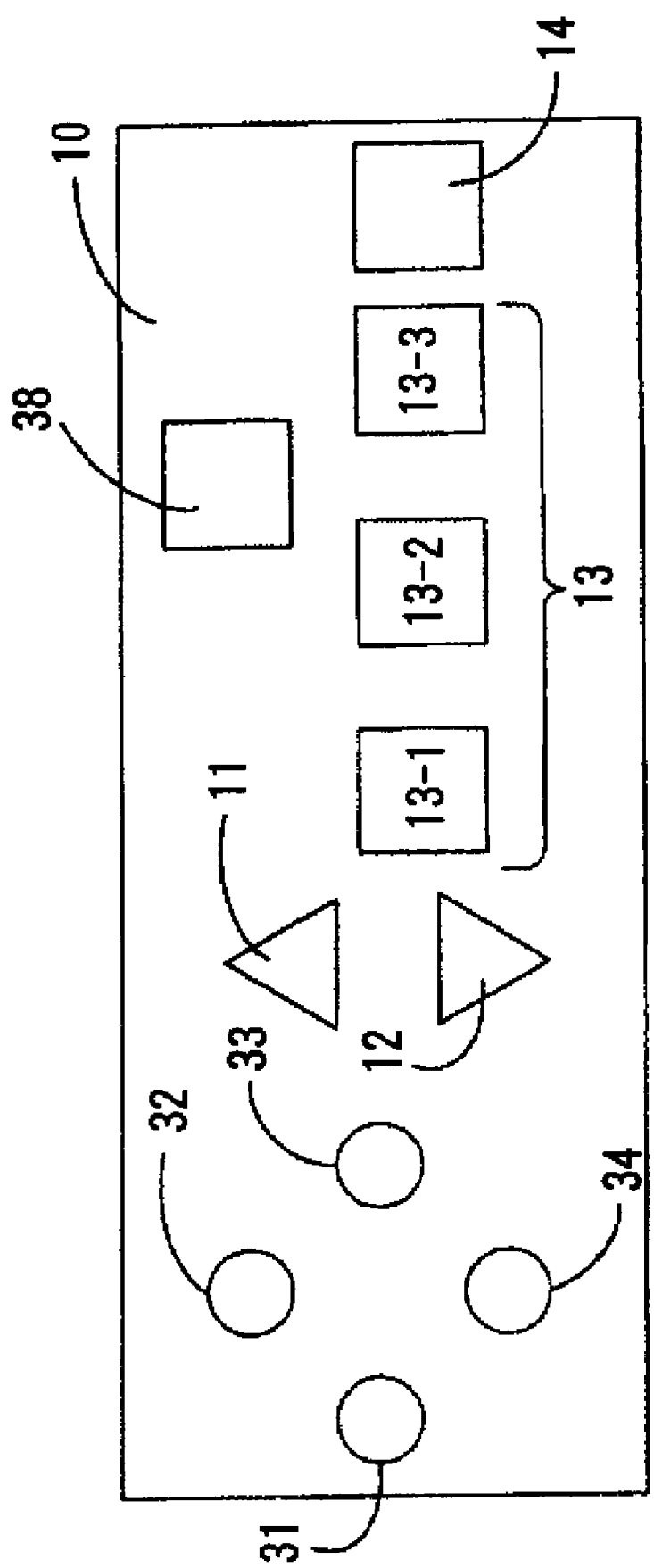
FIG. 10 is a block diagram showing the structure of a focus detection area operating section provided in the optical apparatus according to Embodiment 3.

FIG. 10 is a diagram showing the arrangement of the focus detection area operating section replacing the focus detection area operating section 10 in FIG. 1. Reference numerals 10 to 14 and 31 to 34 denote switches having the same function as in Embodiment 2 (see FIG. 6). Reference numeral 38 denotes an area initialization switch serving as a fourth operating member for performing an initialization of the focus detection area.

Next, using FIGS. 1 and 10, the process flow regarding the focus detection area is explained for the various blocks. As in Embodiment 1, this process can be divided into a focus detection area storage process and a focus detection area switching process.

The procedure of the focus detection area storage process is similar to that in Embodiment 2 (see FIG. 7).

The procedure of the focus detection area switching process is basically also similar to that in Embodiment 2 (see FIG. 8), but in the present embodiment, when the area initialization switch 38 is turned on, the size and the position of the focus detection area are switched to an initialization size and position, and a focusing process is performed for this initialized focus detection area (initial area). Here, "initial area" means a focus detection area which is set at first, when the power source of the optical apparatus is turned on, and is set as a focus detection area having a predetermined size at a predetermined position (for example at a standard position in the center) of the image-taking area.

Figure 11:
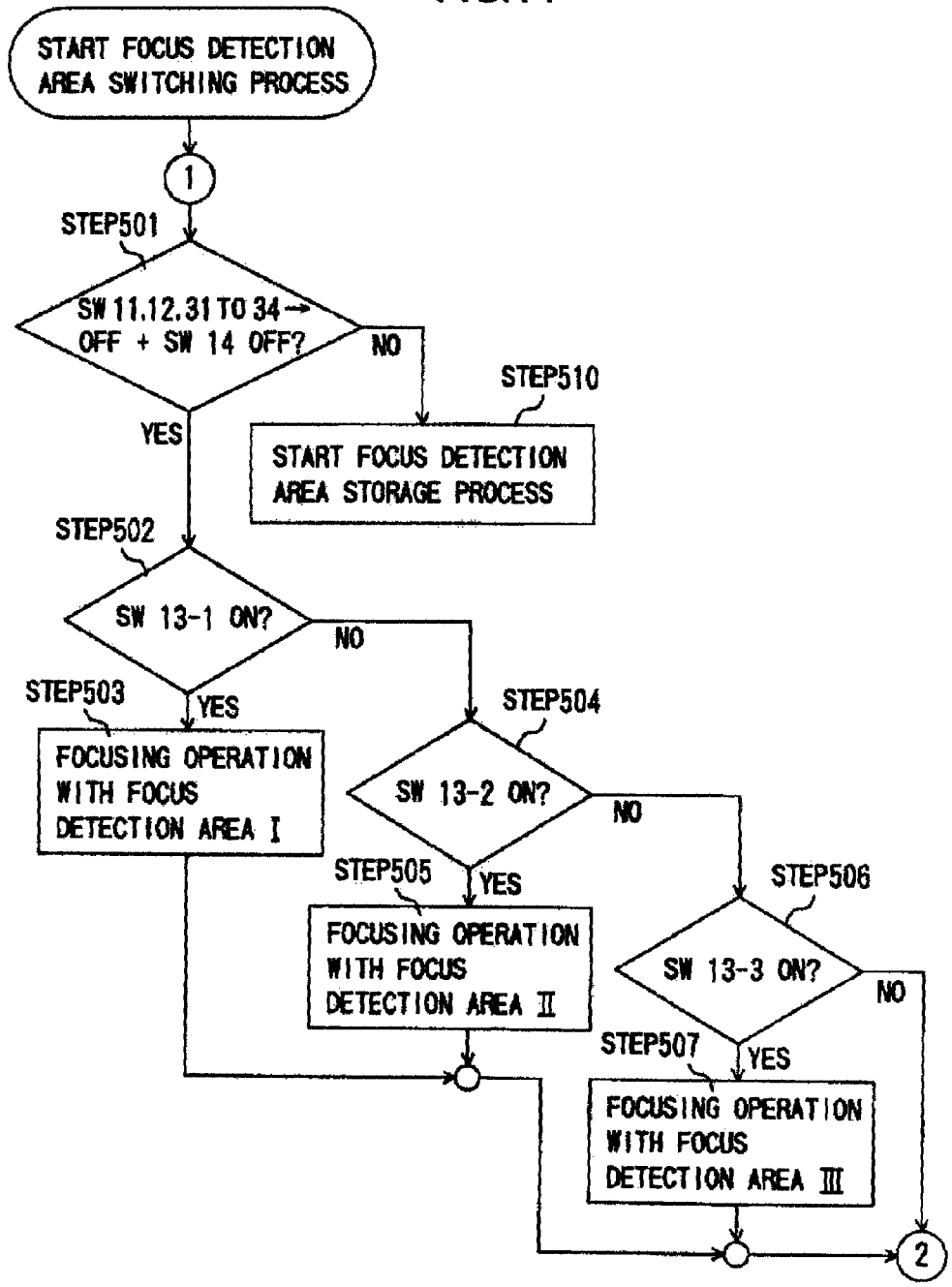
FIG. 11 is a flowchart showing the focus detection area switching process in Embodiment 3.
Figure 12:
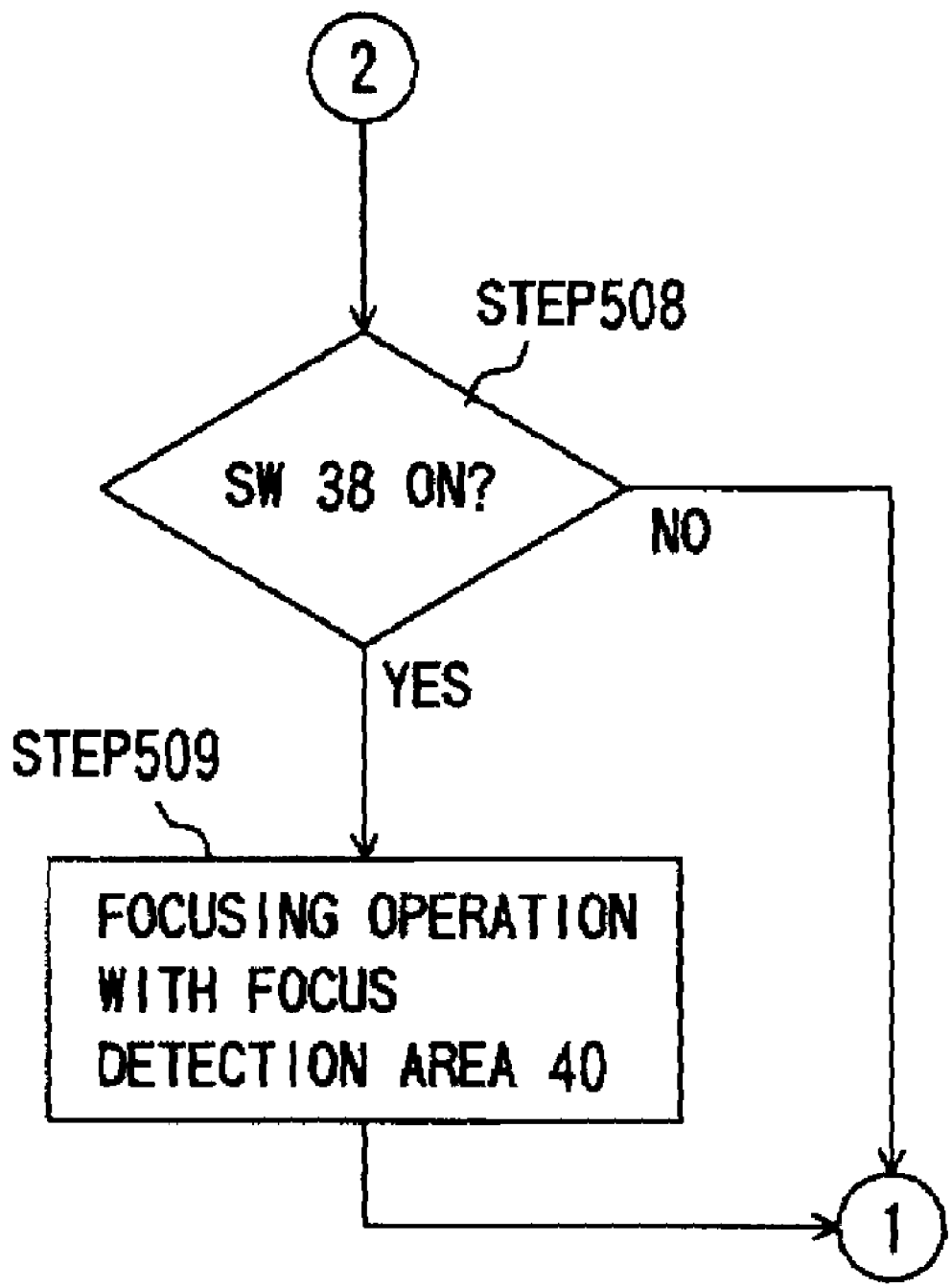
FIG. 12 is a flowchart showing the focus detection area switching process in Embodiment 3.

FIGS. 11 and 12 are flowcharts showing the procedure of the focus detection area switching process carried out by the CPU 6 when the focus detection area operating section 10 is operated. It should be noted that in both figures, like circled numbers denote portions at which the flowcharts are connected together.

In FIG. 11, steps 501 to 505, 507 and 510 perform similar processing as steps 401 to 405 and 407 in FIG. 8 of Embodiment 2, so that they are not explained further.

At step 506, if the area selection switch 13-3 is on, the procedure advances to step 507, and if it is not on, as well as following steps 503, 505 and 507, it advances to step 508.

At step 508, if the area initialization switch 38 is on, the procedure advances to step 509, the focus detection area is switched to the initial area 40, and a focusing process is carried out for this focus detection area.

After step 509 as well as if the area initialization switch 38 is not on at step 508, the procedure returns to step 501, and a focusing process is carried out in accordance with the same procedure.

Figure 13:
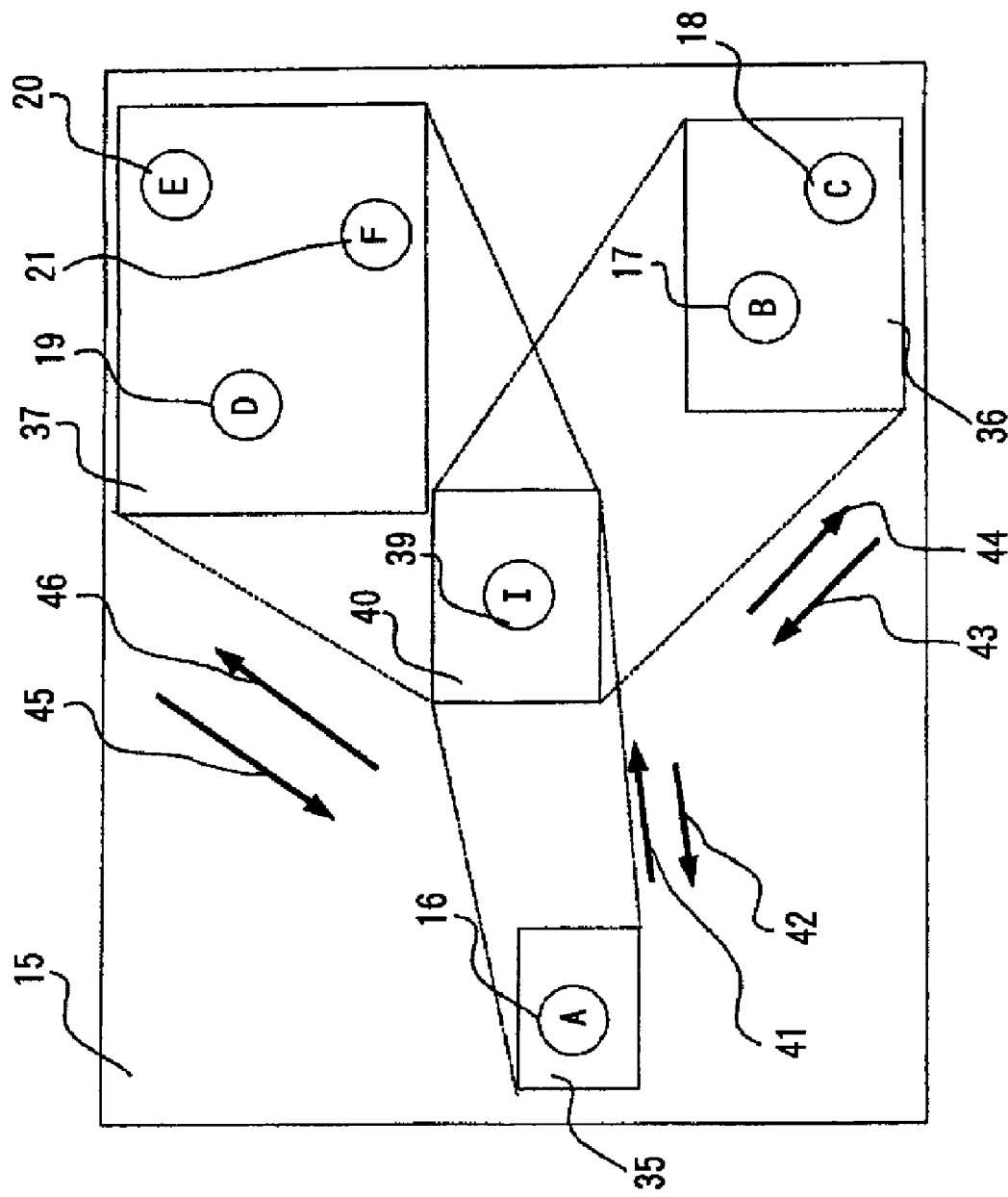
FIG. 13 is a diagram illustrating the focus detection area switching operation in Embodiment 3.

FIG. 13 is a diagram showing how the focus detection area is switched when operating the area selection switches 13 and the area initialization switch 38 while taking images. In FIG. 13, reference numerals 15 to 21 and 35 to 37 are the same as in FIG. 9. Reference numeral 39 denotes an object I, and reference numeral 40 denotes an initial area, which is set by turning the area initialization switch 38 on. Reference numeral 41 denotes a direction in which the focus detection area is switched when the area initialization switch 38 is turned on while the focus detection area I has been set. Reference numeral 42 denotes a direction in which the focus detection area is switched when the area selection switch 13-1 is turned on while the initial area 40 has been set. Reference numeral 43 denotes a direction in which the focus detection area is switched when the area initialization switch 38 is turned on while the focus detection area II has been set. Reference numeral 44 denotes a direction in which the focus detection area is switched when the area selection switch 13-2 is turned on while the initial area 40 has been set. Reference numeral 45 denotes a direction in which the focus detection area is switched when the area initialization switch 38 is turned on while the focus detection area III has been set. Reference numeral 46 denotes a direction in which the focus detection area is switched when the area selection switch 13-3 is turned on while the initial area 40 has been set.

It should be noted that in this embodiment, the size and the position of the focus detection area can be stored and switched, but it is also possible to make only the size of the focus detection area storable and switchable, as in Embodiment 1.

The size and position of the focus detection area (initial area) after power-on may be set to any of the focus detection areas I, II and III assigned in the focus detection area storage process, or to the above-described initial area 40.

Thus, by assigning suitable sizes and positions of the focus detection area to the area selection switches 13-1, -2, and -3, and storing these focus detection area sizes and positions in the memory 9, it is easy to select three focus detection areas which differ from each other in at least one of size and position during image-taking. Also, it is possible to switch the size and the position of the focus detection area to the size and the position of the initial area by operating only the area initialization switch 38.

It should be noted that in this embodiment, there are three area selection switches 13, but the number of those switches is not limited to three, and may be n (where n is a natural number). Moreover, in this embodiment, the focusing process continues constantly while the area selection switches 13 are on, but it is also possible to fix the focus lens 2 after performing the focusing process once.

With the above-described structure, the operator can store focus detection areas of any size and position in advance in the memory 9 before image-taking, and can set these focus detection areas during image-taking by a simple operation. Furthermore, regardless at what size and position the focus detection area is, the operator can change the focus detection area to the initial area 40 by operating one switch during image-taking or during the storage operation. As a result, quick switching and storing of the focus detection area becomes possible, and it becomes possible to concentrate on other image-taking controls.

Embodiment 4

Figure 14:
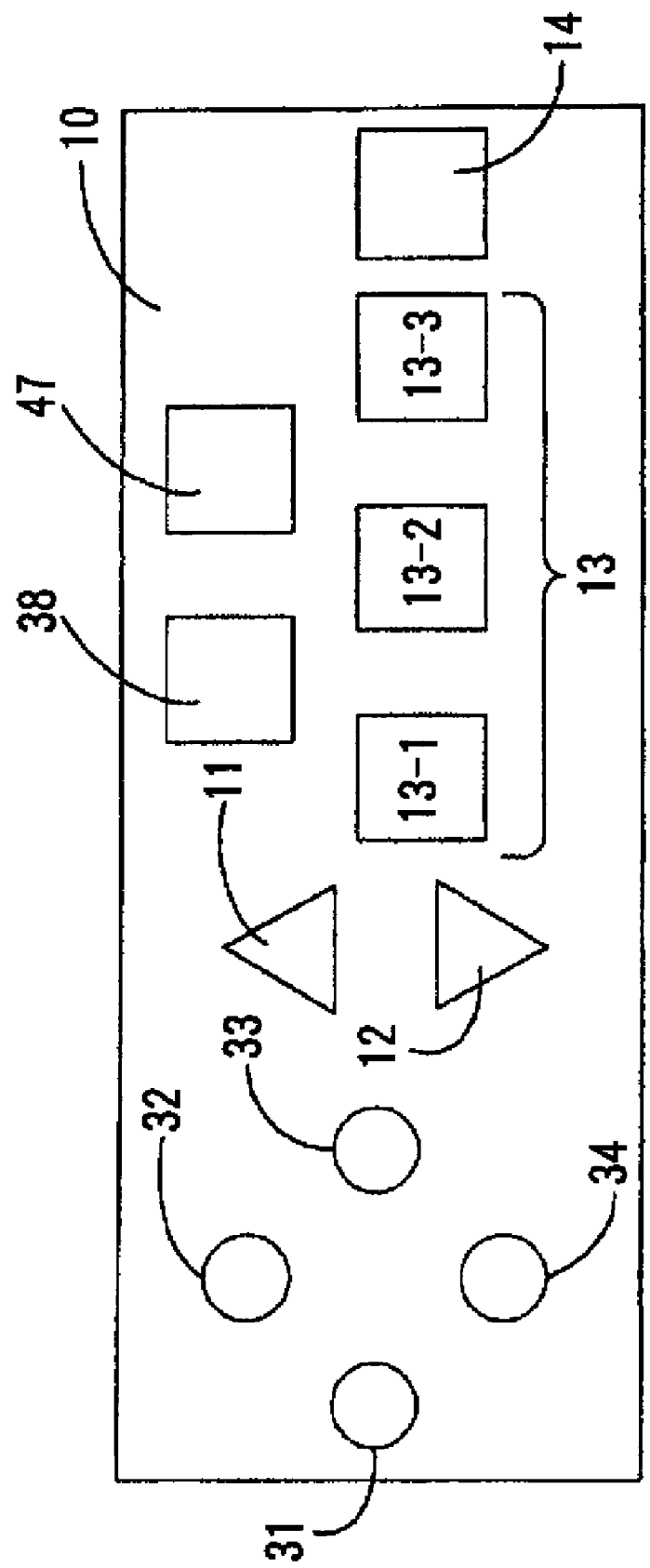
FIG. 14 is a block diagram showing the structure of a focus detection area operating section provided in the optical apparatus according to Embodiment 4.
Figure 15:
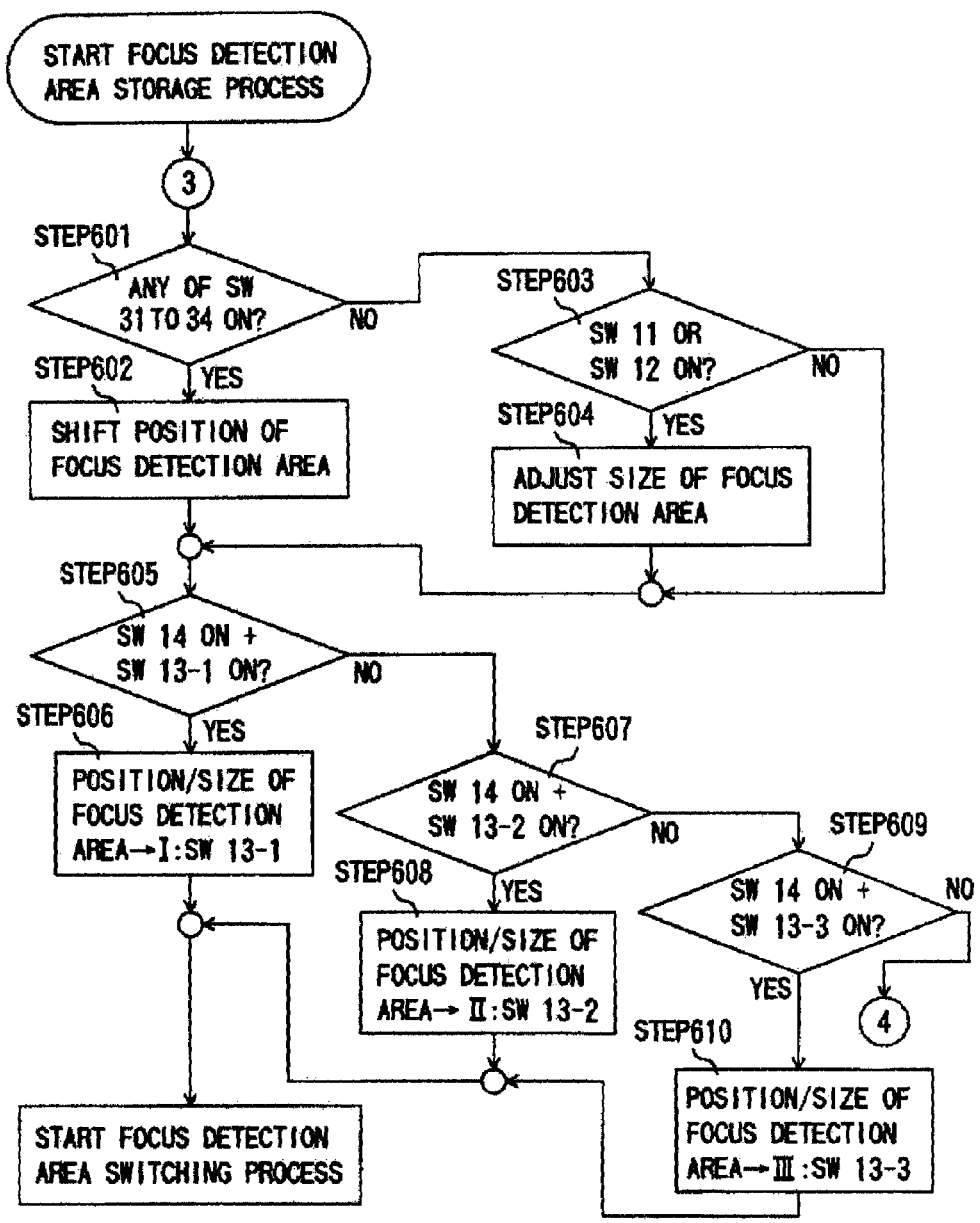
FIG. 15 is a flowchart showing the focus detection area storage process in Embodiment 4.
Figure 16:
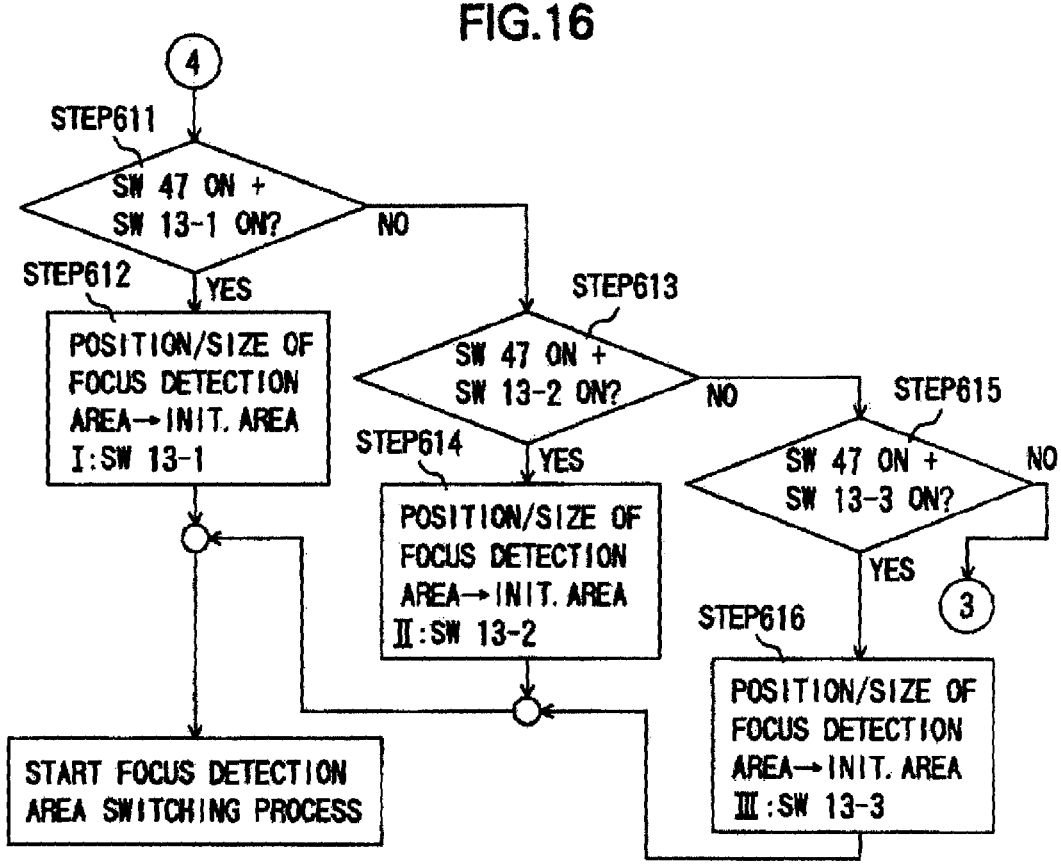
FIG. 16 is a flowchart showing the focus detection area storage process in Embodiment 4.

Referring to FIGS. 14 to 16, the following is an explanation of Embodiment 4 of the present invention. The structure of an optical apparatus of this embodiment is similar to that of Embodiment 1 as shown in FIG. 1, so that structural elements common to both are denoted by the same numerals as in FIG. 1.

FIG. 14 is a diagram showing the arrangement of the focus detection area operating section replacing the focus detection area operating section 10 in FIG. 1. In FIG. 14, reference numerals 11 to 14, 31 to 34 and 38 denote switches having the same function as in Embodiment 3 (see FIG. 10).

Reference numeral 47 denotes an initial area determination switch for storing an initial focus detection area immediately after power-up.

Using FIGS. 1 and 14, the process flow is explained for the various blocks. As in Embodiment 1, the processing can be divided into a focus detection area storage process and a focus detection area switching process.

First, the focus detection area storage process is explained. In the focus detection area storage process, when the initial area determination switch 47 is operated together with the area selection switch group 13, then the CPU 6 assigns the initial area which is set during power-up of the optical apparatus to the operated switch of the area selection switch group 13, and stores it in the memory 9.

That is to say, in the present embodiment, three initial areas which differ in at least one of size and position can be assigned to the area selection switches 13-1 to 13-3 and stored.

FIGS. 15 and 16 are flowcharts showing the procedure of the control process carried out by the CPU 6 during the storage process. It should be noted that in both figures, like circled numbers denote portions at which the flowcharts are connected together.

In FIG. 15, steps 601 to 608 and 610 perform similar processing as steps 301 to 308 and 310 in FIG. 7 of Embodiment 2, so that they are not explained further.

At step 609, if the area selection switch 13-3 is not on while the area determination switch 14 is on, then the procedure advances to step 611. If, at step 611, the area selection switch 13-1 is on while the initial area determination switch 47 is on, then the procedure advances to step 612, and the size and the position of the focus detection area at that time is assigned as the initial area I to the area selection switch 13-1 and stored in the memory 9.

If, at step 611, the area selection switch 13-1 is not on while the initial area determination switch 47 is on, then the procedure advances to step 613. If, at step 613, the area selection switch 13-2 is on while the initial area determination switch 47 is on, then the procedure advances to step 614, and the size and the position of the focus detection area at that time is assigned as the initial area II to the area selection switch 13-2 and stored in the memory 9.

If, at step 613, the area selection switch 13-2 is not on while the initial area determination switch 47 is on, then the procedure advances to step 615. If, at step 615, the area selection switch 13-3 is on while the initial area determination switch 47 is on, then the procedure advances to step 616, and the size and the position of the focus detection area at that time is assigned as the initial area III to the area selection switch 13-3 and stored in the memory 9.

If, at step 615, the area selection switch 13-3 is not on while the initial area determination switch 47 is on, then the procedure advances to step 601, and the storage process is continued with the same procedure. Following step 612, 614 and 616, the procedure advances to the focus detection area switching process. The focus detection area switching process is similar to the process explained in Embodiment 2 using FIG. 8.

It should be noted that in this embodiment, the size and the position of the focus detection area can be stored and switched, but it is also possible to make only the size of the focus detection area storable and switchable, as in Embodiment 1.

Moreover, as in Embodiment 3, the size and position of the initial area set during power-on of the optical apparatus may be set freely.

Furthermore, as in Embodiments 1 to 3, the size and position of the initial area for power-on may be selected from one of the focus detection areas I, II and III stored in the focus detection area storage process, and the above-described initial area 40 shown in FIG. 13.

Thus, by assigning suitable sizes and positions of the focus detection area to the area selection switches 13-1, -2, and -3, and storing these focus detection area sizes and positions as the initial area in the memory 9, it is possible to select three focus detection areas which differ from each other in at least one of size and position as the initial area.

It should be noted that in this embodiment, there are three area selection switches 13, but the number of those switches is not limited to three, and may be n (where n is a natural number). Moreover, in this embodiment, the focusing process continues constantly while the area selection switches 13 are on, but it is also possible to fix the focus lens 2 after performing the focusing process once.

With the above-described structure, in addition to attaining a similar effect as with Embodiment 2, the operator can store three initial areas of any size and position in advance, so that it is possible to change the size and/or position of the focus detection area at power-on with a simple operation. Furthermore, by storing suitable initial areas, it is possible to quickly start image-taking without or with few operations for changing the focus detection area after power-on.

Embodiment 5

Referring to FIGS. 17 to 20, the following is an explanation of Embodiment 5 of the present invention. The structure of an optical apparatus of this embodiment is similar to that of Embodiment 1 as shown in FIG. 1, so that structural elements common to both are denoted by the same numerals as in FIG. 1.

Figure 17:
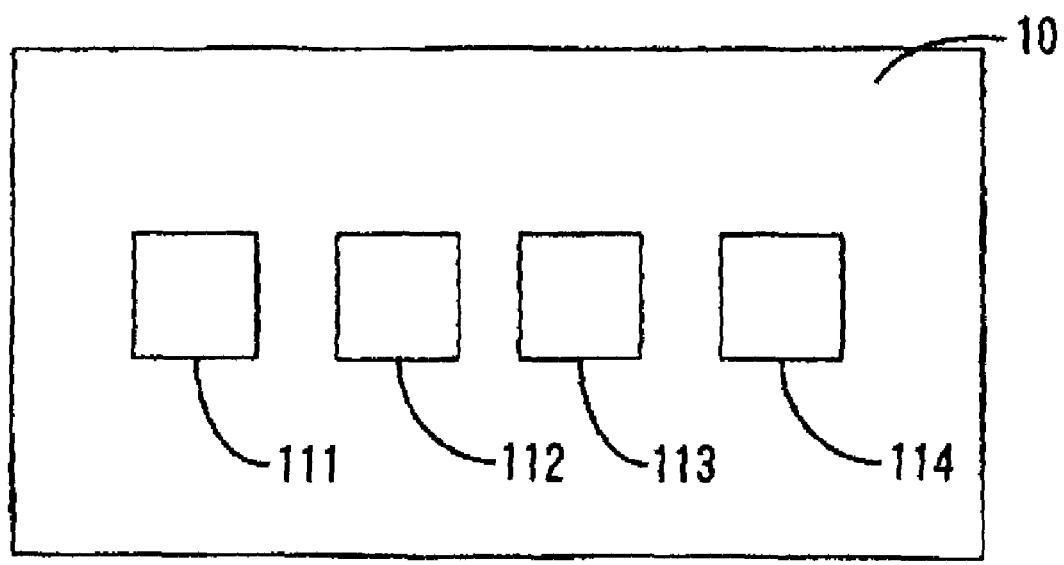
FIG. 17 is a block diagram showing the structure of a focus detection area operating section according to Embodiment 5.

FIG. 17 is a diagram showing the arrangement of the focus detection area operating section of this embodiment replacing the focus detection area operating section 10 in FIG. 1. In FIG. 17, reference numerals 111 and 112 denote size setting switches serving as first operating members for setting the size of the focus detection area, and they are an expansion switch and a contraction switch, respectively. Reference numeral 113 denotes an area selection switch serving as a second operating member, and reference numeral 114 denotes an area determination switch.

The processing performed by the CPU 6 can be divided into a focus detection area storage process and a focus detection area switching process. First, using FIGS. 1 and 17, the process flow of the storage process is explained for the various blocks.

The state of the switches in FIG. 2 is monitored by the CPU 6. Turning on one of the switches, a corresponding process is executed by the CPU 6. While the area size setting switch 111 or 112 is on, the CPU 6 changes the size of the focus detection area in the direction corresponding to the operated switch (that is, in an expanding or a contracting direction). And while the area determination switch 114 is on, the size of the focus detection area can be assigned to the state (on or off) of the area selection switch 113 at that time and stored in the memory 9. That is to say, in this embodiment, two focus detection areas of different sizes can be stored.

Figure 18:
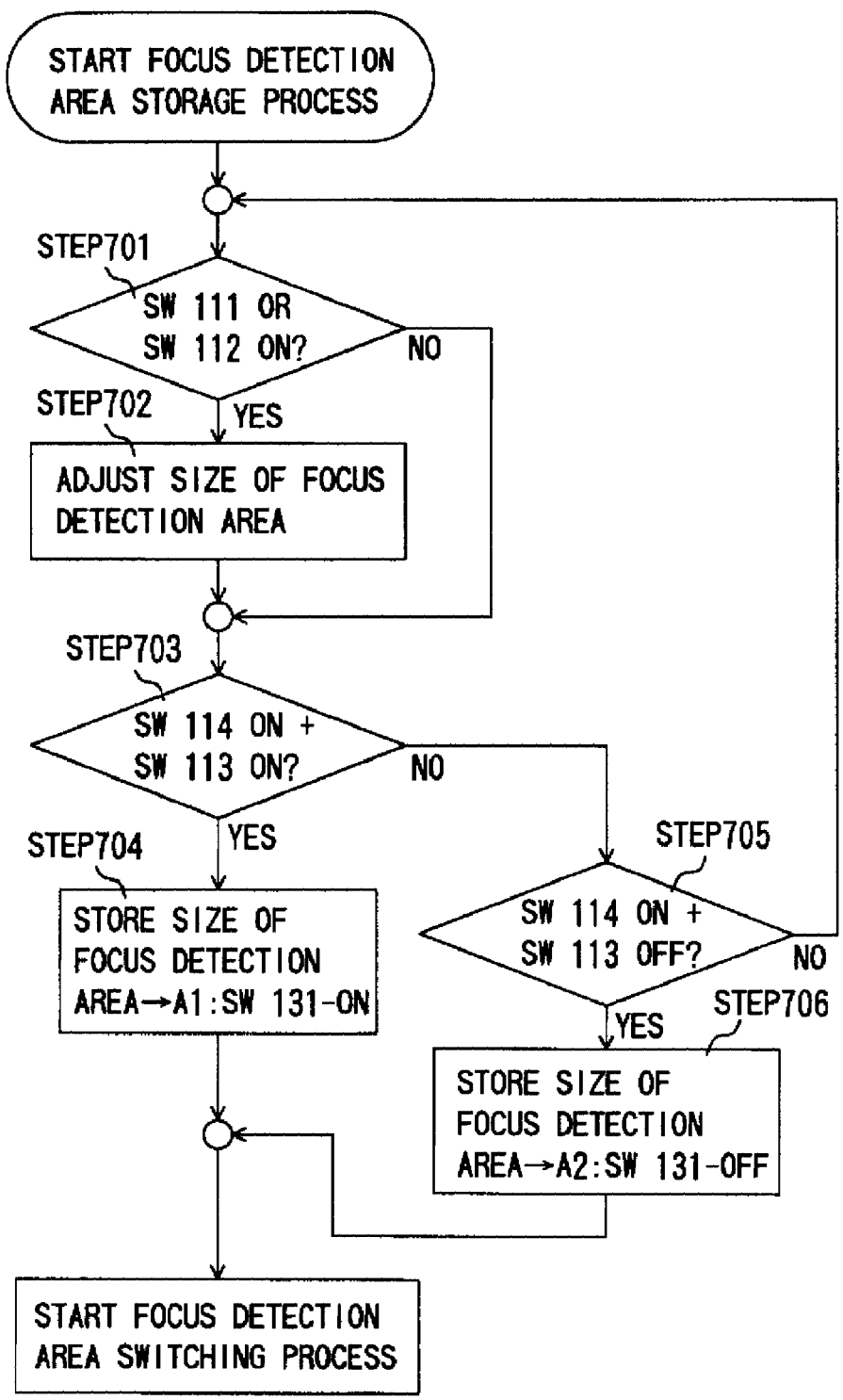
FIG. 18 is a flowchart showing the focus detection area storage process in Embodiment 5.

FIG. 18 is a flowchart showing the procedure for the process of storing the focus detection area executed by the CPU 6.

At step 701 in FIG. 18, if one of the size setting switches 111 and 112 is on, then the procedure advances to step 702, where the size of the focus detection area is changed in the direction corresponding to the state of the size setting switches 111 and 112. If neither of the size setting switches 111 and 112 is on at step 701, then the procedure advances to step 703 with the size of the focus detection area being fixed.

Then, at step 703, if the area selection switch 113 is on while the area determination switch 114 is on, the procedure advances to step 704, and taking the size of the focus detection area at this time as the focus detection area A1, it is assigned to the area selection switch 113 being on, and stored in the memory 9. If, at step 703, the area selection switch 113 is not turned on while the area determination switch 114 is on, then the procedure advances to step 705.

At step 705, if the area selection switch 113 is turned off while the area determination switch 114 is on, the procedure advances to step 706. At step 706, taking the size of the focus detection area at this time as the focus detection area A2, it is assigned to the area selection switch 113 being off, and stored in the memory 9. If, at step 705, the area determination switch 114 is not on, then the procedure returns to step 701. Moreover, after step 704 and step 706, the procedure advances to the focus detection area switching process, which is explained later.

It should be noted that it is presumed that in the storage process in FIG. 18, the focus detection area switching function of the area selection switch 113 is automatically deactivated. That is to say, when the area selection switch 113 is turned on in the focus detection area storage process, then the focus detection area will not be switched. At the time of advancing to the following focus detection area switching process, the focus detection area switching function of the area selection switch is automatically activated.

Referring to FIGS. 1 and 17, the following is an explanation of the process flow of the focus detection area switching process for the various blocks.

While the area selection switch 113 is off when taking images, an AF evaluation value signal is generated in the AF evaluation section 5 in a focus detection area that has been previously assigned to this off state and stored in the memory 9, and the CPU 6 controls the driving of the focus lens 2, based on this AF evaluation value signal and the position of the focus lens 2 obtained with the lens position detection section 8, performing a focusing process.

Figure 19:
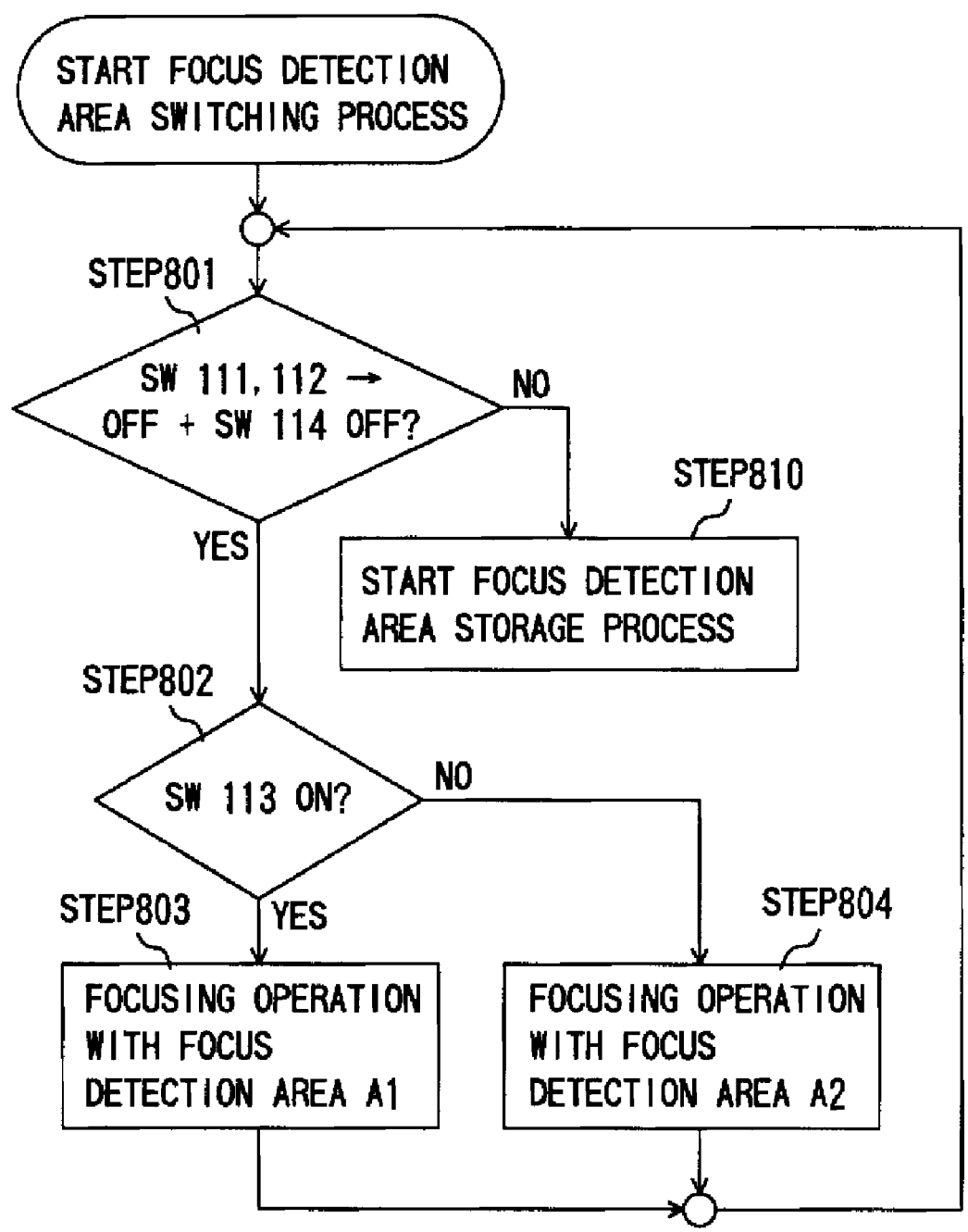
FIG. 19 is a flowchart showing the focus detection area switching process in Embodiment 5.

FIG. 19 is a flowchart showing the procedure of the process carries out by the CPU 6 in the focus detection area switching process.

In FIG. 19, at step 801, if the size setting switches 111 and 112 are off and the area determination switch 114 is off, then the procedure advances to step 802. If, at step 801, the focus detection area size setting switches 111 and 112 are on or the area determination switch 114 is on, then the focus detection area storage process (step 810) shown in FIG. 18 begins.

If, at step 802, the area selection switch 113 is on, then the procedure advances to step 803, and a focusing process is carried out with respect to the focus detection area A1 which has been previously stored in the memory 9. If, at step 802, the area selection switch 113 is not on, then the procedure advances to step 804, and a focusing process is carried out with respect to the focus detection area A2 which has been previously stored in the memory 9. After steps 803 and 804, the procedure returns to step 801, and a focusing process is carried out in accordance with the same procedure.

Figure 20:
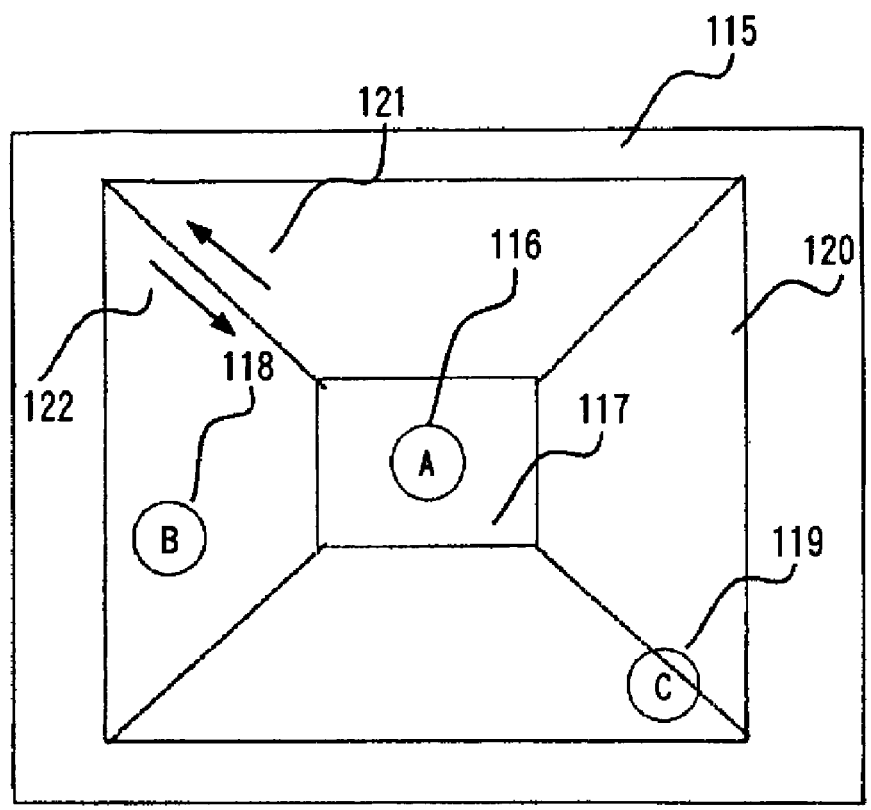
FIG. 20 is a diagram illustrating the focus detection area switching operation in Embodiment 5.

FIG. 20 is a diagram showing how the focus detection area is switched when operating the area selection switch 113 while taking images.

In FIG. 20, reference numeral 115 denotes the image-taking area. Reference numeral 116 denotes an object A, and reference numeral 117 denotes a focus detection area A1, which has such a size that the image-taking optical system can be focused onto the object A. Reference numeral 118 denotes an object B, and reference numeral 119 denotes an object C. Reference numeral 120 denotes a focus detection area A2, which has such a size that the image-taking optical system can be focused onto both the objects B and C. Reference numeral 121 and 122 respectively denote directions in which the focus detection area is switched when the area selection switch 113 is turned off or on. The size of the focus detection area (initial area) after power-on may be set to the size of the focus detection area A1 or the focus detection area A2 stored in the focus detection area storage process.

Thus, by assigning focus detection areas having a suitable size to the on state and the off state of the area selection switch 113, and storing them in the memory 9, it is possible to store focus detection areas of two sizes corresponding to one switch.

It should be noted that in this embodiment, the focusing process continues constantly while the area selection switch 113 is on or off, but it is also possible to fix the focus lens 2 after performing the focusing process once, for only the on state of the area selection switch 113. It is further possible to fix the focus lens 2 after performing the focusing process once, for only the off state of the area selection switch 113. It is also possible to fix the focus lens 2 after performing the focusing process once, for the on and the off state of the area selection switch 113.

Moreover, this embodiment has been explained for one area determination switch 114, but it is also possible to provide one switch each for the on and the off state of the area selection switch 113.

With the above-described structure, the operator can store two focus detection areas of different sizes before image-taking, and can switch the size of the focus detection area by a simple operation during image-taking. As a result, it becomes possible to quickly switch the focus detection area, and it is possible to concentrate on other image-taking controls.

Embodiment 6

Referring to FIGS. 21 to 24, the following is an explanation of Embodiment 6 of the present invention.

The structure of an optical apparatus of this embodiment is similar to that of Embodiment 1 as shown in FIG. 1, so that structural elements common to both are denoted by the same numerals as in FIG. 1.

Figure 21:
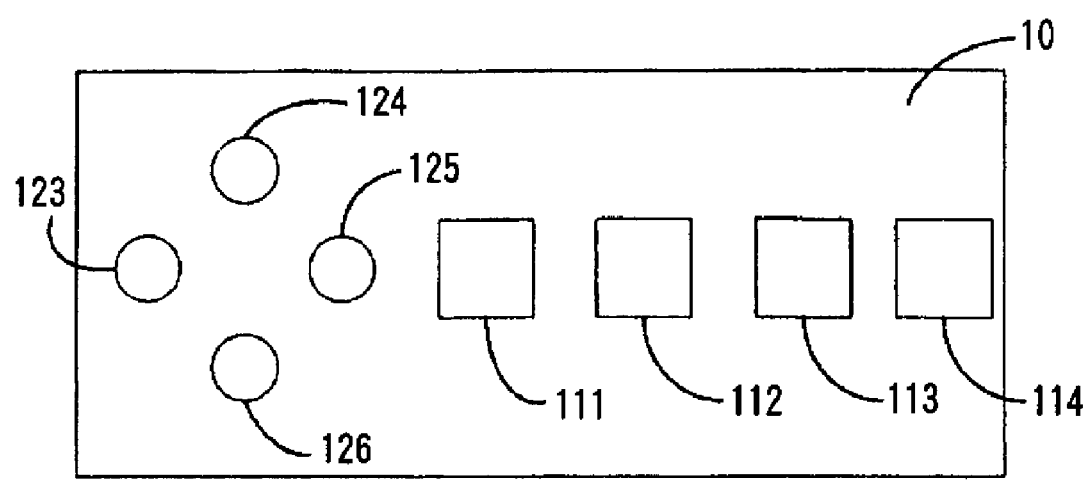
FIG. 21 is a block diagram showing the structure of a focus detection area operating section according to Embodiment 6.

FIG. 21 is a diagram showing the arrangement of the focus detection area operating section of this embodiment replacing the focus detection area operating section 10 in FIG. 17. The switches 111 to 114 in FIG. 21 have the same function as the switches 111 to 114 in FIG. 17.

Reference numerals 123 to 126 denote area shifting switches for shifting the focus detection area serving as a first operating member, and include a left-shift switch 123, an upward-switch shift 124, a right-shift switch 125 and a downward-shift switch 126.

The processing performed by the CPU 6 can be divided into a focus detection area storage process and a focus detection area switching process. First, using FIGS. 1 and 21, the process flow of the storage process is explained for the various blocks.

The state of the switches in FIG. 21 is monitored by the CPU 6. Turning on one of the switches, a corresponding process is executed by the CPU 6. The process performed when the size setting switches 111 and 112 are turned on is the same as in Embodiment 5.

When the area shifting switches 123 to 126 are turned on, the CPU 6 shifts the focus detection area within the image-taking area in a direction corresponding to the switch which has been turned on. And when the area determination switch 114 is turned on, the size and the position of the focus detection area are assigned to the state (on or off) of the operated area selection switch 113 and stored in the memory 9. That is to say, in this embodiment, two focus detection areas differing in at least one of size and position can be stored.

Figure 22:
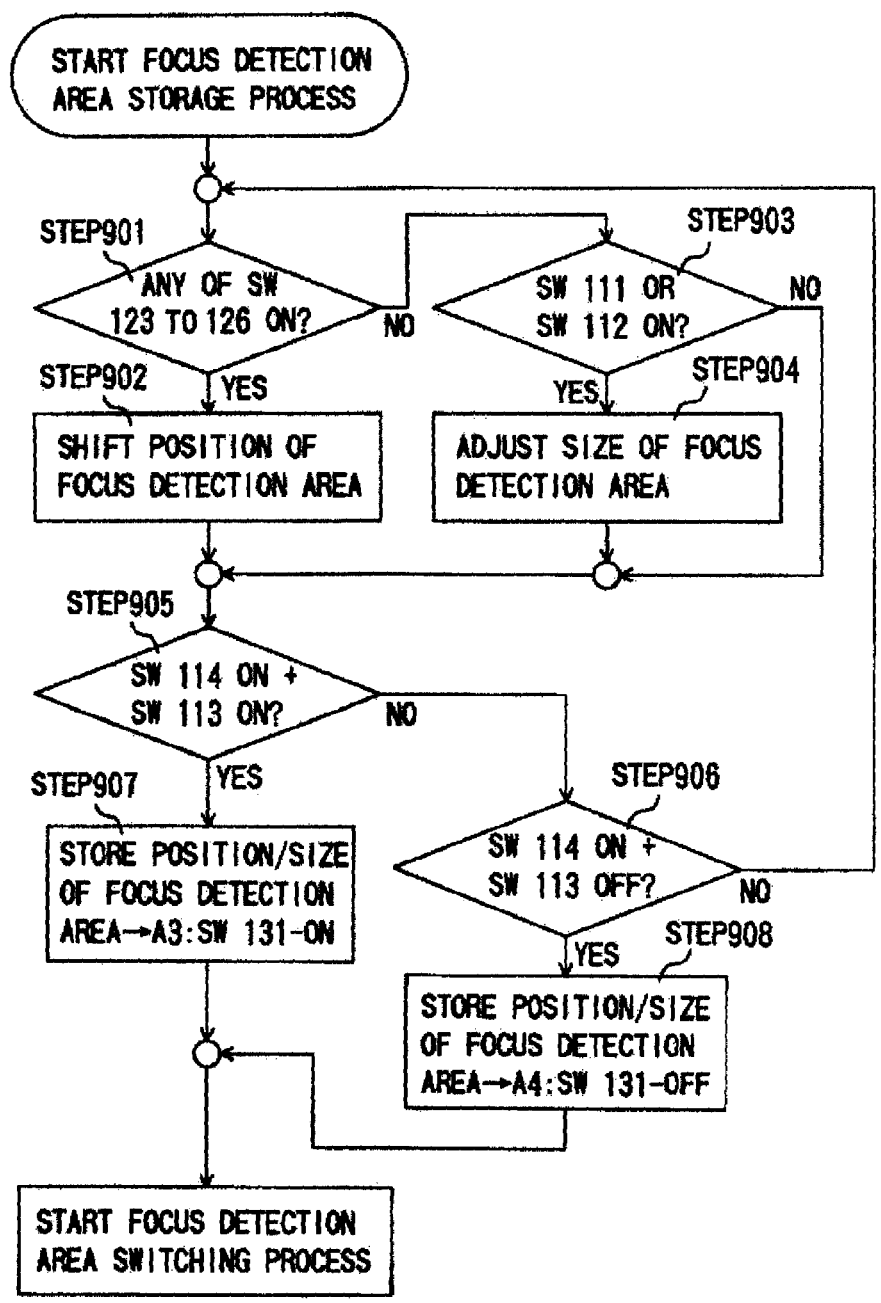
FIG. 22 is a flowchart showing the focus detection area storage process in Embodiment 6.

FIG. 22 is a flowchart showing the procedure for the process of storing the focus detection area executed by the CPU 6 in this embodiment.

In FIG. 22, if any one of the area shifting switches 123 to 126 is on at step 901, then the procedure advances to step 902, and the focus detection area is switched in the direction corresponding to the switch which is on. If none of the area shifting switches 123 to 126 is on at step 901, then the procedure advances to step 903 with the position of the focus detection area being fixed.

At step 903, if the size setting switches 111 or 112 is on, then the procedure advances to step 904, where the size of the focus detection area is changed in the direction corresponding to the state of the operated size setting switches 111 and 112 (that is, in an expanding or contracting direction). After the processing of steps 902 and 904 as well as if neither of the size setting switches 111 and 112 is on at step 903, the procedure advances to step 905.

At step 905, if the area selection switch 113 is on while the area determination switch 114 is on, the procedure advances to step 906, and taking the size and position of the focus detection area at this time as the focus detection area A3, it is assigned to the on state of the area selection switch 113, and stored in the memory 9.

If, at step 905, the area selection switch 113 is not on while the area determination switch 114 is on, then the procedure advances to step 907. At step 907, if the area selection switch 113 is turned off while the area determination switch 114 is on, then the procedure advances to step 908, and taking the size and position of the focus detection area at this time as the focus detection area A4, it is assigned to the off state of the area selection switch 113 and stored in the memory 9.

If, at step 907, the area determination switch 114 is not on, then the procedure returns to step 901. Moreover, after steps 906 and 908, the procedure advances to the focus detection area switching process, which is explained later. It should be noted that it is presumed that in the storage process in FIG. 22, the focus detection area switching function of the area selection switch 113 is automatically deactivated.

That is to say, when the area selection switch 113 is turned on in the focus detection area storage process, then the focus detection area will not be switched. At the time of advancing to the following focus detection area switching process, the focus detection area switching function of the area selection switch 113 is automatically activated.

The procedure of the focus detection area switching process is similar to that in Embodiment 5 and is therefore not explained further.

Figure 23:
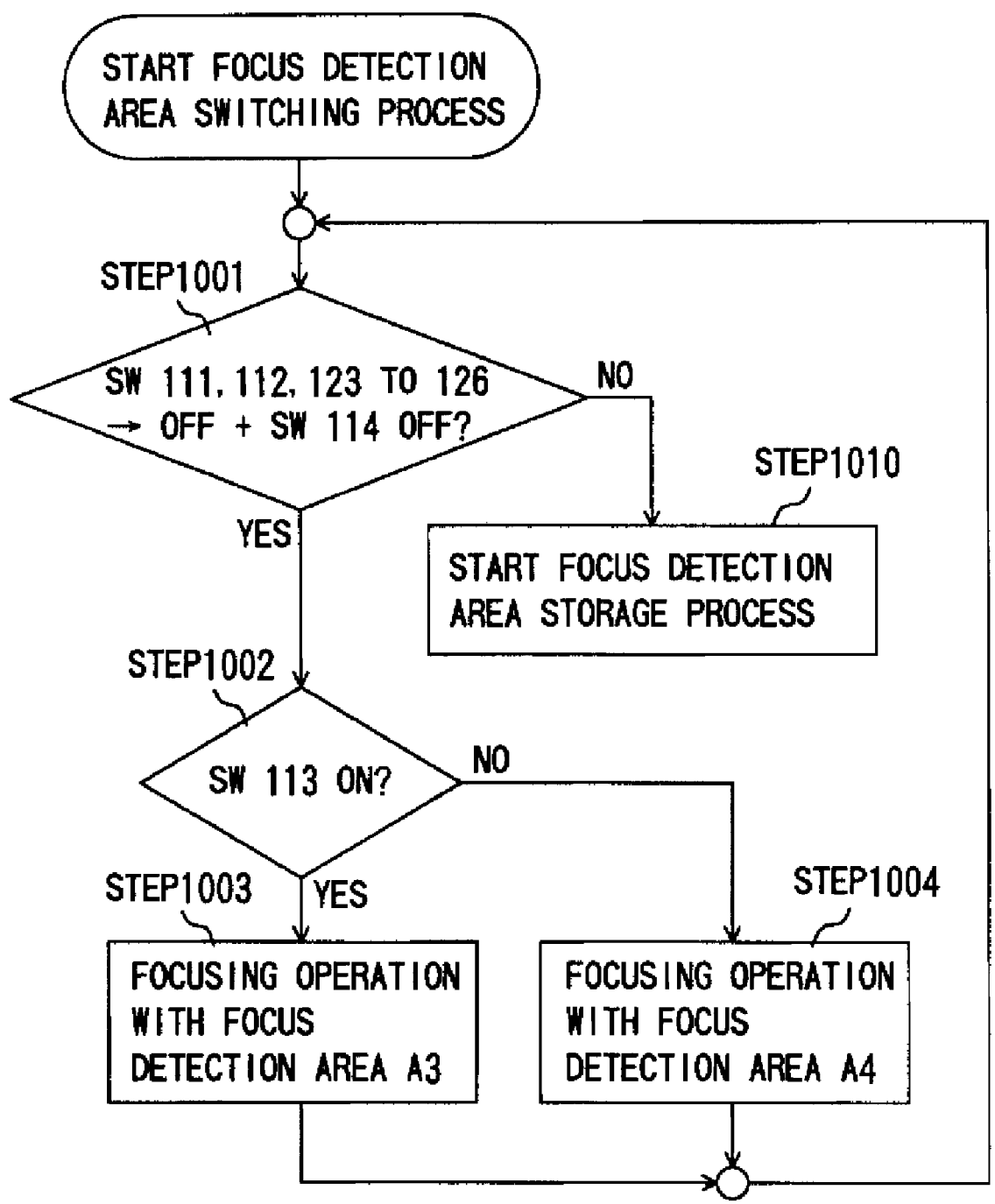
FIG. 23 is a flowchart showing the focus detection area switching process in Embodiment 6.

FIG. 23 is a flowchart showing the procedure of the process carried out by the CPU 6 when the focus detection area operating section 10 is operated.

In FIG. 23, steps 1002 and 1010 perform similar processing as steps 802 and 810 shown in FIG. 19 of Embodiment 5, so that they are not explained further.

If, at step 1001, the size setting switches 111 and 112 and the area shifting switches 123 to 126 are all off, and the area determination switch 114 is not off then the procedure advances to the focus detection area storage process.

At step 1003, a focusing process is carried out with respect to the focus detection area A3 which has been previously stored in the memory 9, and at step 1004, a focusing process is carried out with respect to the focus detection area A4 which has been previously stored in the memory 9. Moreover, after steps 1003 and 1004, the procedure returns to step 1001, and a focusing process is carried out in accordance with the same procedure.

Figure 24:
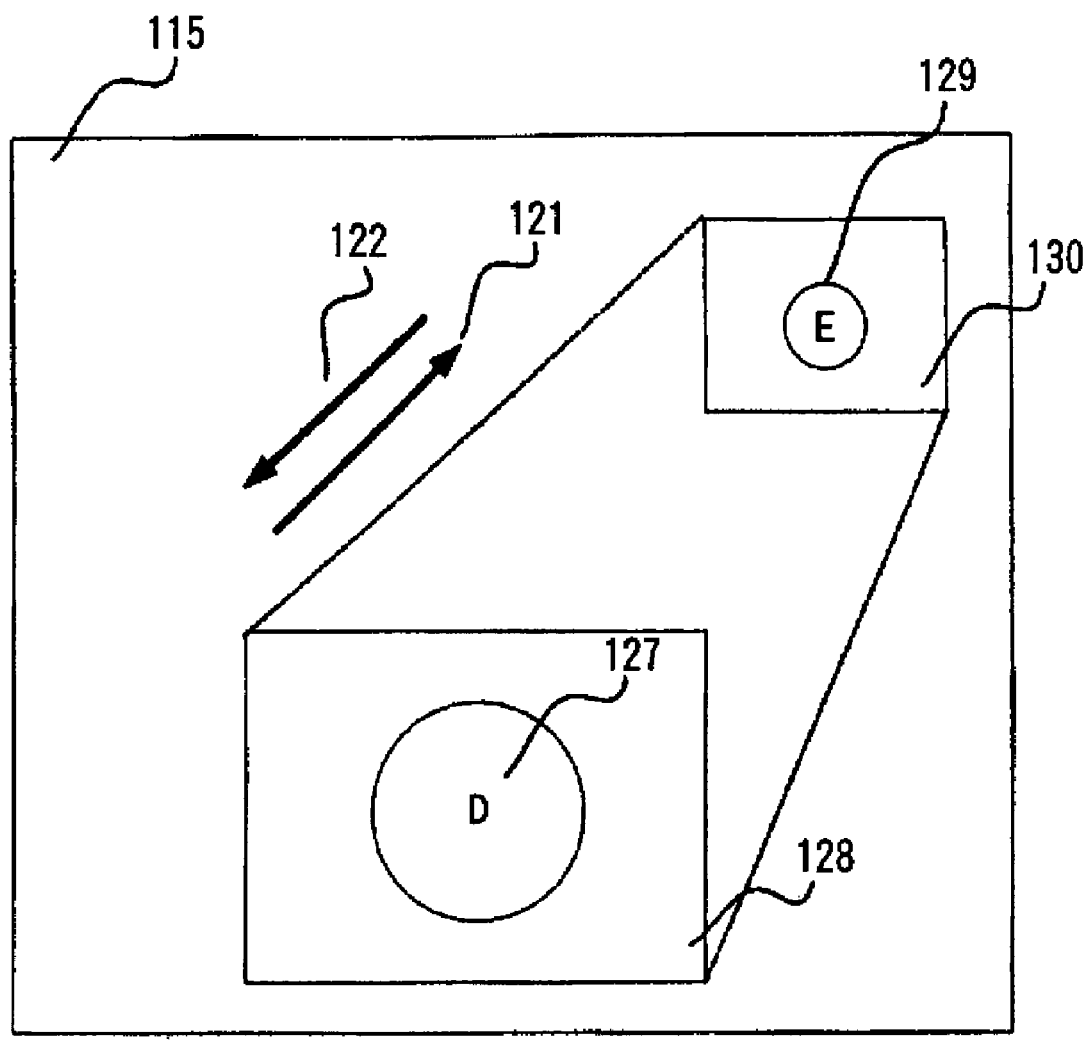
FIG. 24 is a diagram illustrating the focus detection area switching operation in Embodiment 6.

FIG. 24 is a diagram showing how the focus detection area is switched when operating the area selection switch 113 while taking images.

In FIG. 24, reference numeral 115 denotes the image-taking area. Reference numeral 127 denotes an object D, and reference numeral 128 denotes a focus detection area A3, which has such a size and position that the image-taking optical system can be focused onto the object D. Reference numeral 129 denotes an object E, and reference numeral 130 denotes a focus detection area A4, which has such a size and position that the object E can be focused. As in Embodiment 1, reference numerals 121 and 122 respectively denote directions in which the focus detection area is switched when the area selection switch 113 is turned off or on.

The size and position of the focus detection area (initial area) after power-on may be set to the focus detection area A3 or the focus detection area A4 stored in the focus detection area storage process.

It should be noted that in this embodiment, the focusing process continues constantly while the area selection switch 113 is on or off, but it is also possible to fix the focus lens 2 after performing the focusing process once, for only the on state of the area selection switch 113. It is further possible to fix the focus lens 2 after performing the focusing process once, for only the off state of the area selection switch 113. It is also possible to fix the focus lens 2 after performing the focusing process once, for the on and the off state of the area selection switch 113.

Moreover, this embodiment has been explained for one area determination switch 114, but it is also possible to provide one switch each for the on and the off state of the area selection switch 113.

Employing the above-described structure, the operator can store two focus detection areas of different size and position before image-taking, and can switch the focus detection area by a simple operation during image-taking. As a result, it becomes possible to quickly switch the focus detection area, and it is possible to concentrate on other image-taking controls.

Embodiment 7

Referring to FIGS. 25 to 28, the following is an explanation of Embodiment 7 of the present invention.

The structure of an optical apparatus of this embodiment is similar to that of Embodiment 1 as shown in FIG. 1, so that structural elements common to both are denoted by the same numerals as in FIG. 1. Also the structure of the focus detection area operating section 10 is similar to that in FIG. 21.

Figure 25:
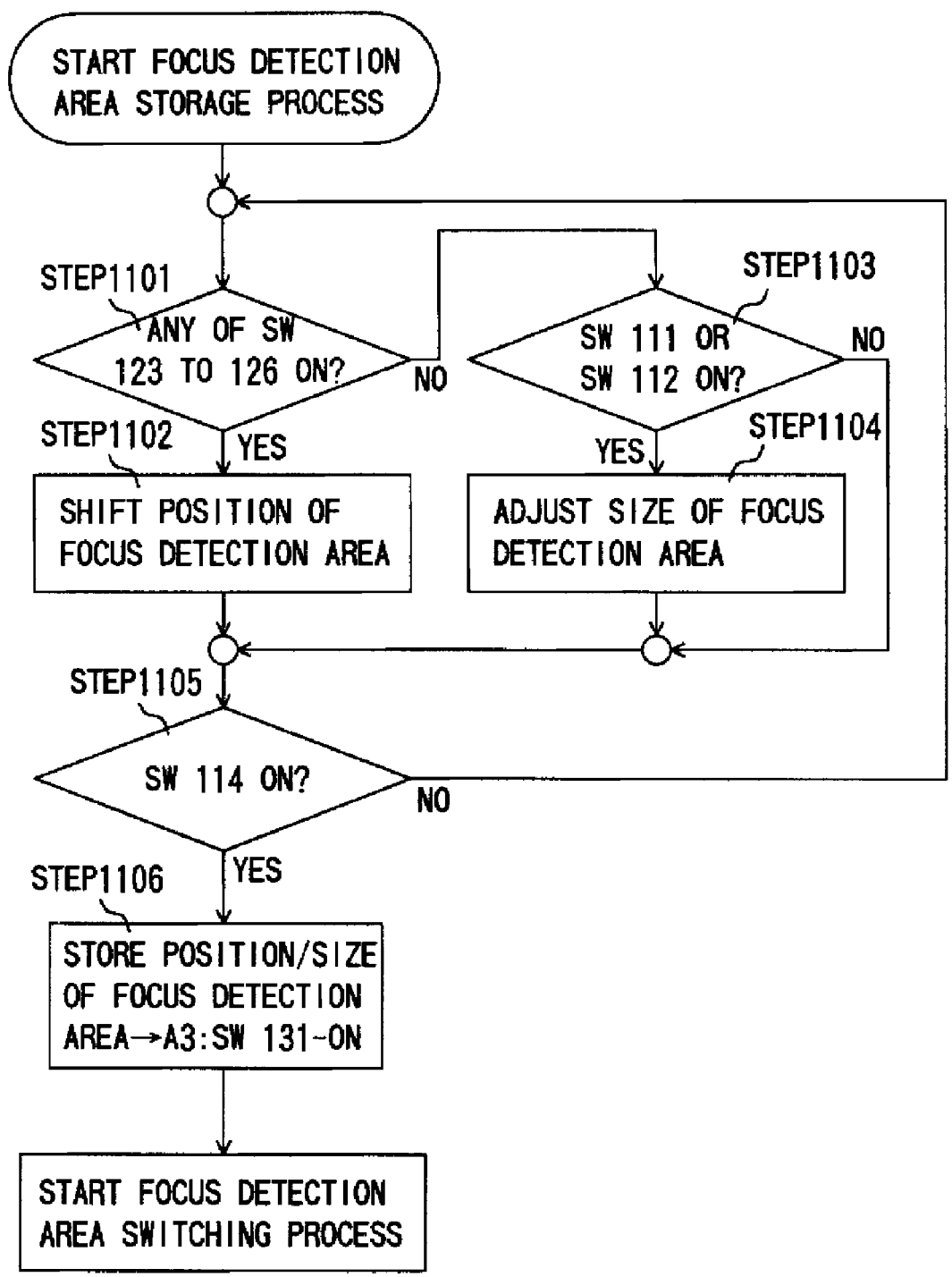
FIG. 25 is a flowchart showing the focus detection area storage process in Embodiment 7.

FIG. 25 is a flowchart showing the procedure for the process of storing the focus detection area executed by the CPU 6 in this embodiment.

In FIG. 25, steps 1101 to 1104 are similar to steps 901 to 904 shown in FIG. 22 of Embodiment 6.

At step 1105, if the area determination switch 114 serving as the third operating member is on, the procedure advances to step 1106, and taking the size and position of the focus detection area at this time as the focus detection area A3, it is assigned to the on state of the area selection switch 113, and stored in the memory 9. If, at step 1105, the area determination switch 114 is not turned on, then the procedure returns to step 1101.

Figure 26:
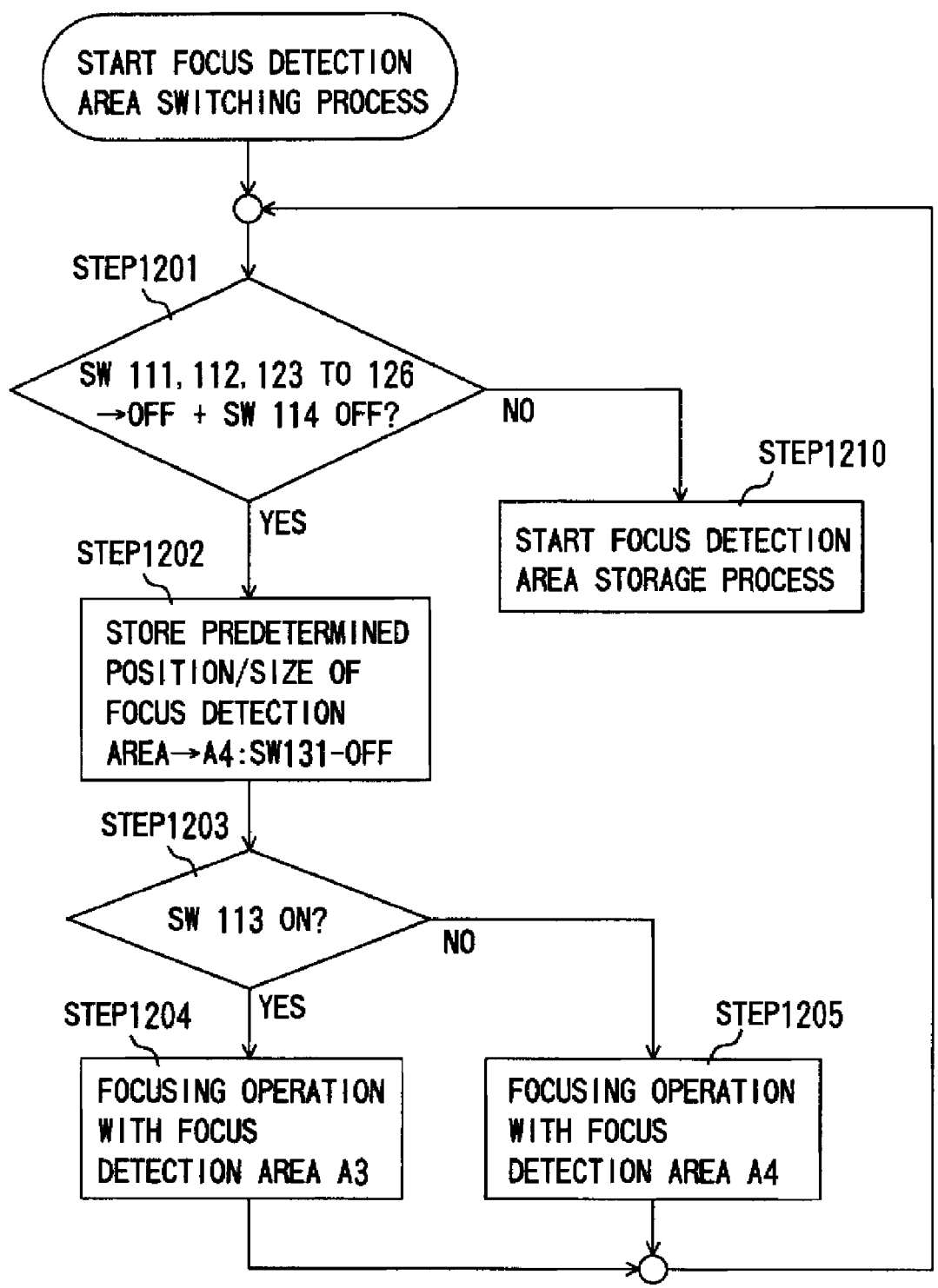
FIG. 26 is a flowchart showing the focus detection area switching process in Embodiment 7.

After step 1106, the procedure advances to the focus detection area switching process shown in FIG. 26. Steps 1201, 1203 to 1205 and 1210 in FIG. 26 are similar to steps 1001 to 1004 and 1010 shown in FIG. 23 of Embodiment 6, so that they are not further explained.

At step 1202, the size and position of the focus detection area set in advance by the size setting switches 111 and 112 and by the area shifting switches 123 to 126 is stored in the memory 9 as the focus detection area A4 (assigned to the off state of the area selection switch 113). Then, at steps 1203 to 1205, a focusing process is performed with respect to the focus detection areas A3 or A4, depending on whether the area selection switch 113 is on or off.

Thus, by storing one focus detection area in correspondence with operation of the area determination switch 114, and performing the storage of another focus detection area automatically, it is possible to switch between two focus detection areas of different size and position.

In this embodiment, the size and the position of the focus detection area can be stored and switched, but it is also possible to make only the size of the focus detection area storable and switchable, as in Embodiment 1.

Moreover, the size and position of the focus detection area (initial area) after power-on may be set to the focus detection area A3 assigned in the focus detection area storage process.

Moreover, in this embodiment, the focusing process continues constantly while the area selection switch 113 is on or off, but it is also possible to fix the focus lens 2 after performing the focusing process once, for only the on state of the area selection switch 113. It is further possible to fix the focus lens 2 after performing the focusing process once, for only the off state of the area selection switch 113. It is also possible to fix the focus lens 2 after performing the focusing process once, for the on and the off state of the area selection switch 113.

Employing the above-described structure, the operator can store an initial area and a focus detection area of different size and position before image-taking, and can switch easily between two focus detection areas by a simple operation during image-taking. As a result, it becomes possible to quickly switch the focus detection area, and it is possible to concentrate on other image-taking controls.

Embodiment 8

Figure 27:
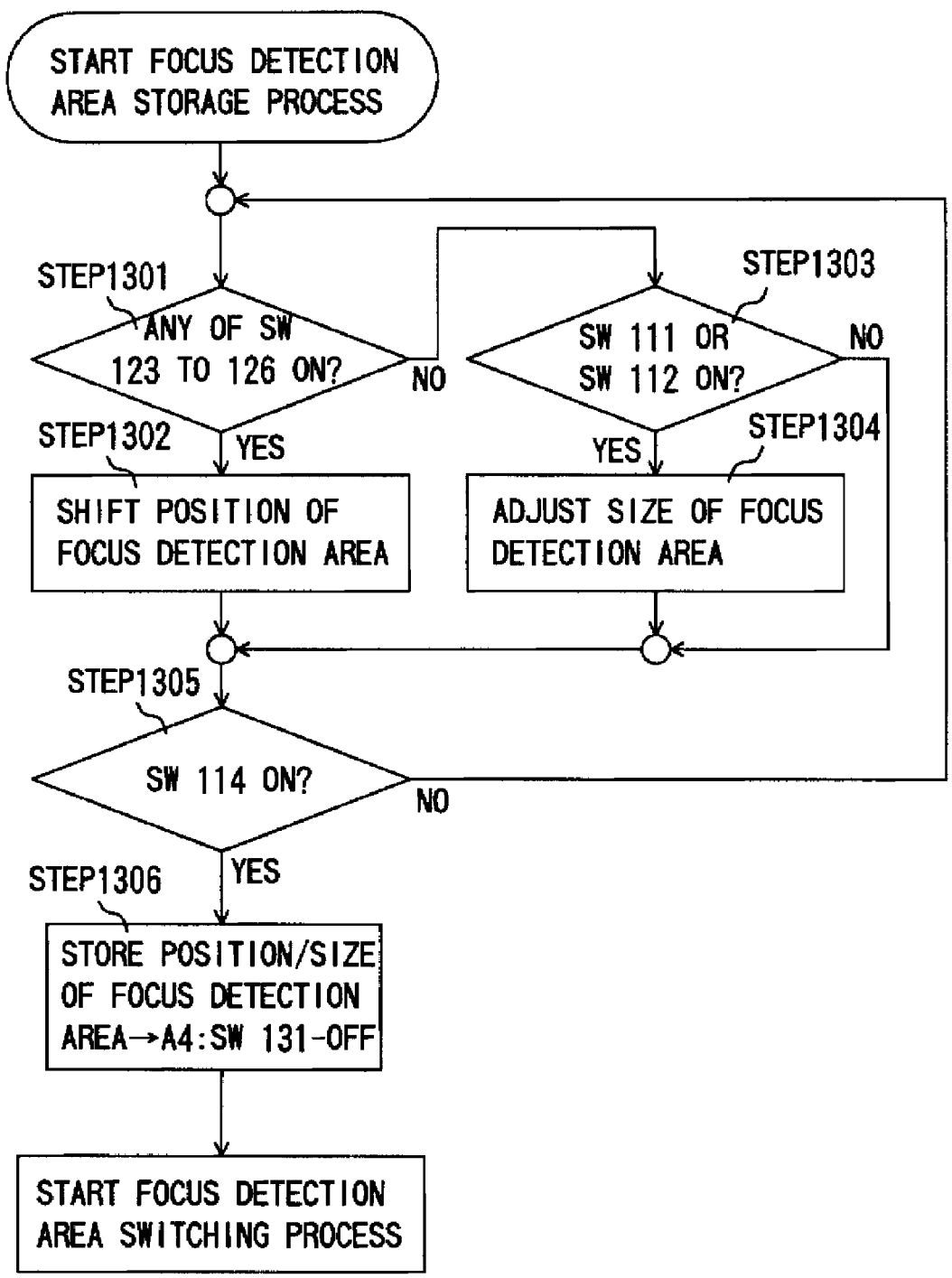
FIG. 27 is a flowchart showing the focus detection area storage process in the optical apparatus according to Embodiment 8.
Figure 28:
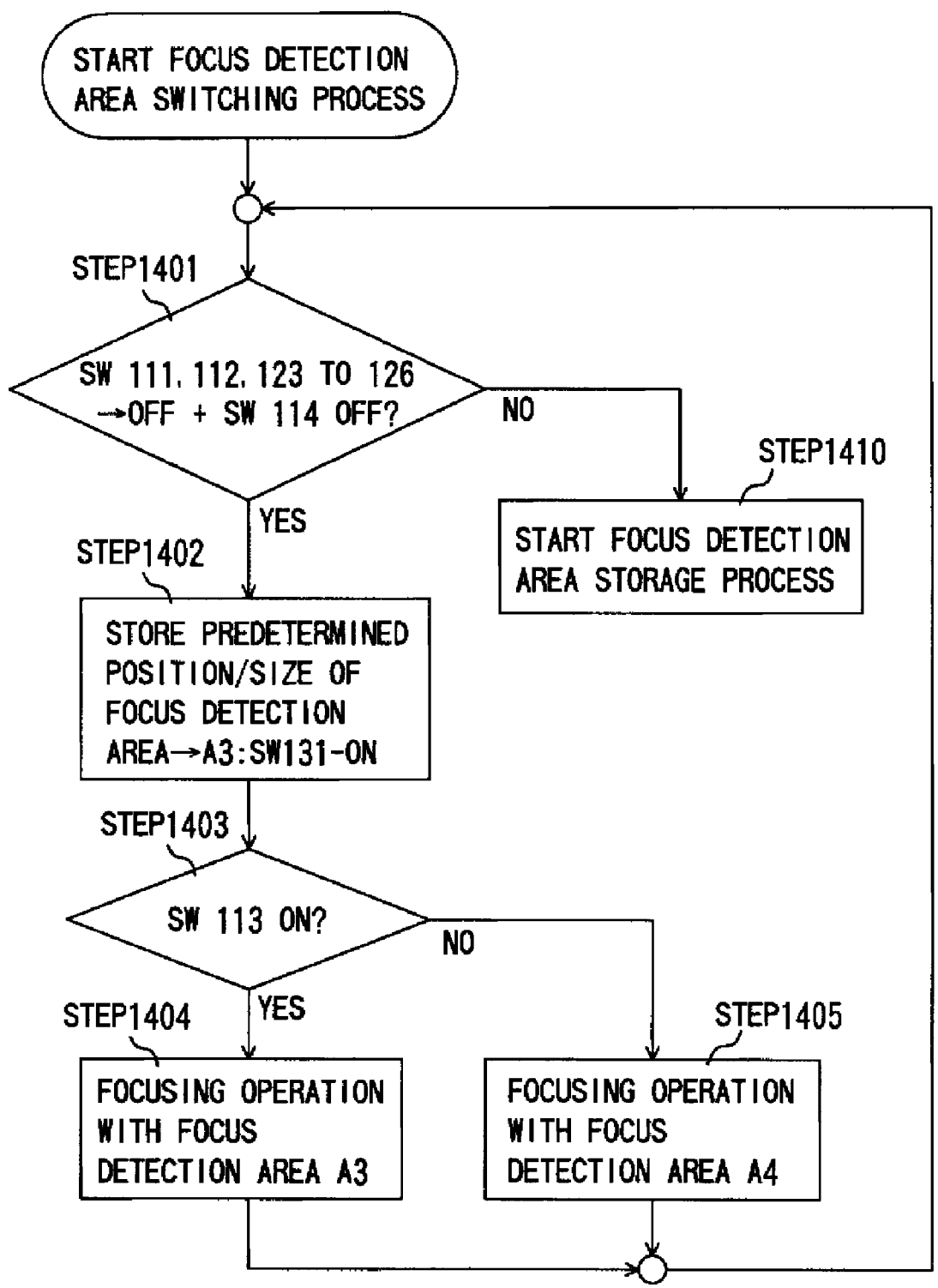
FIG. 28 is a flowchart showing the focus detection area switching process in Embodiment 8.

Referring to FIGS. 27 and 28, the following is an explanation of Embodiment 8 of the present invention.

The structure of an optical apparatus of this embodiment is similar to that of Embodiment 1 as shown in FIG. 1, so that structural elements common to both are denoted by the same numerals as in FIG. 1. Also the structure of the focus detection area operating section 10 is similar to that in FIG. 21.

FIG. 27 is a flowchart showing the procedure for the process of storing the focus detection area executed by the CPU 6 in this embodiment. In FIG. 27, steps 1301 to 1304 are similar to steps 901 to 904 shown in FIG. 22 of Embodiment 6, so that they are not explained further.

At step 1305, if the area determination switch 114 serving as the third operating member is on, the procedure advances to step 1306, and taking the size and position of the focus detection area at this time as the focus detection area A4, it is assigned to the off state of the area selection switch 113, and stored in the memory 9. If, at step 1305, the area determination switch 114 is not turned on, then the procedure returns to step 1301.

After step 1306, the procedure advances to the focus detection area switching process shown in FIG. 28.

Steps 1401, 1403 to 1405 and 1410 in FIG. 28 are similar to steps 1001 to 1004 shown in FIG. 23 of Embodiment 6, so that they are not further explained.

At step 1402, the size and position of the focus detection area set in advance by the size setting switches 111 and 112 and by the area shifting switches 123 to 126 is stored in the memory 9 as the focus detection area A3 (assigned to the on state of the area selection switch 113). Then, at steps 1403 to 1405, a focusing process is performed with respect to the focus detection areas A3 or A4, depending on whether the area selection switch 113 is on or off.

Thus, by storing one focus detection area in correspondence with operation of the area determination switch 114, and performing the storage of another focus detection area automatically, it is possible to switch between two focus detection areas of different size and position.

In this embodiment, the size and the position of the focus detection area can be stored and switched, but it is also possible to make only the size of the focus detection area storable and switchable, as in Embodiment 5.

Moreover, the size and position of the focus detection area (initial area) after power-on may be set to the focus detection area A4 assigned in the focus detection area storage process.

Moreover, in this embodiment, the focusing process continues constantly while the area selection switch 113 is on or off, but it is also possible to fix the focus lens 2 after performing the focusing process once, for only the on state of the area selection switch 113. It is further possible to fix the focus lens 2 after performing the focusing process once, for only the off state of the area selection switch 113. It is also possible to fix the focus lens 2 after performing the focusing process once, for the on and the off state of the area selection switch 113.

Employing the above-described structure, the operator can store two focus detection areas of different size and position before image-taking, and can switch between two focus detection areas by a simple operation during image-taking. As a result, it becomes possible to quickly switch the focus detection area, and it is possible to concentrate on other image-taking controls.

Embodiment 9

Referring to FIGS. 29 to 32, the following is an explanation of Embodiment 9 of the present invention.

The structure of an optical apparatus of this embodiment is similar to that of Embodiment 1 as shown in FIG. 1, so that structural elements common to both are denoted by the same numerals as in FIG. 1.

Figure 29:
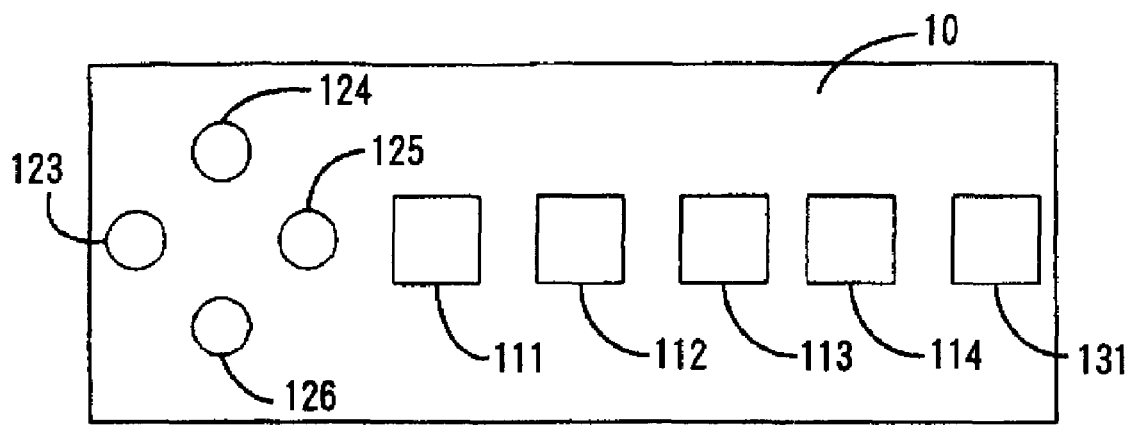
FIG. 29 is a block diagram showing the structure of a focus detection area operating section according to Embodiment 9.

FIG. 29 is a diagram showing the arrangement of the focus detection area operating section replacing the focus detection area operating section 10 in FIG. 1. The switches 111 to 114 and 123 to 126 in FIG. 29 have the same function as the switches in FIG. 21 of Embodiment 6. Reference numeral 131 denotes an initial area determination switch.

Using FIGS. 1 and 29, the process flow is explained for the various blocks. The processing of the CPU 6 can be divided into a focus detection area storage process and a focus detection area switching process.

The focus detection area storage process is basically the same as the one explained with FIG. 18 of Embodiment 5, but in this embodiment, the initial area for power-on can be assigned to the on or off state of the area selection switch 113 and stored in the memory 9 by operating the initial area determination switch 131 together with the area selection switch 113. Thus, it is possible to store two initial areas having a suitable size and position.

Figure 30:
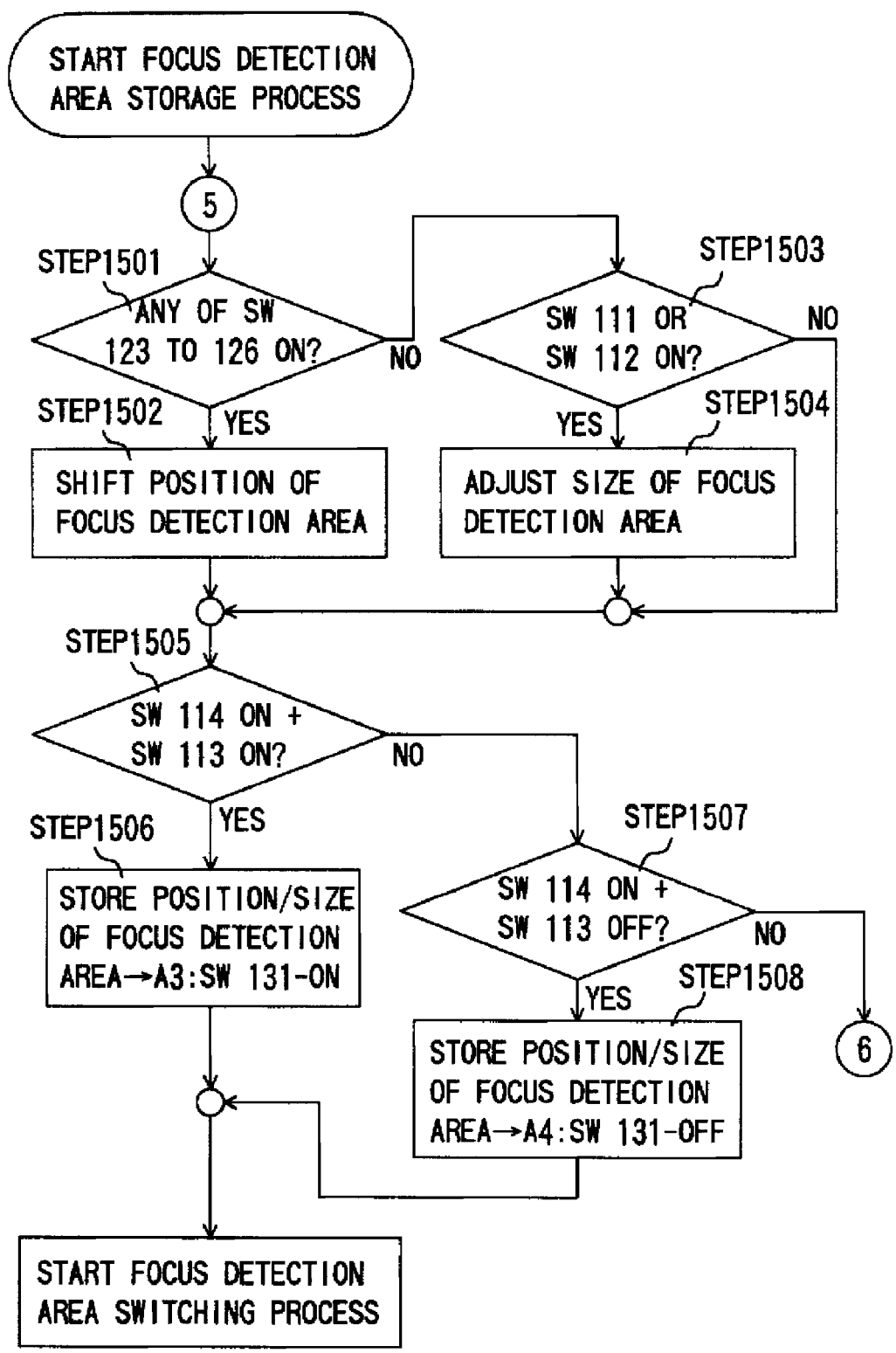
FIG. 30 is a flowchart showing the focus detection area storage process in Embodiment 9.
Figure 31:
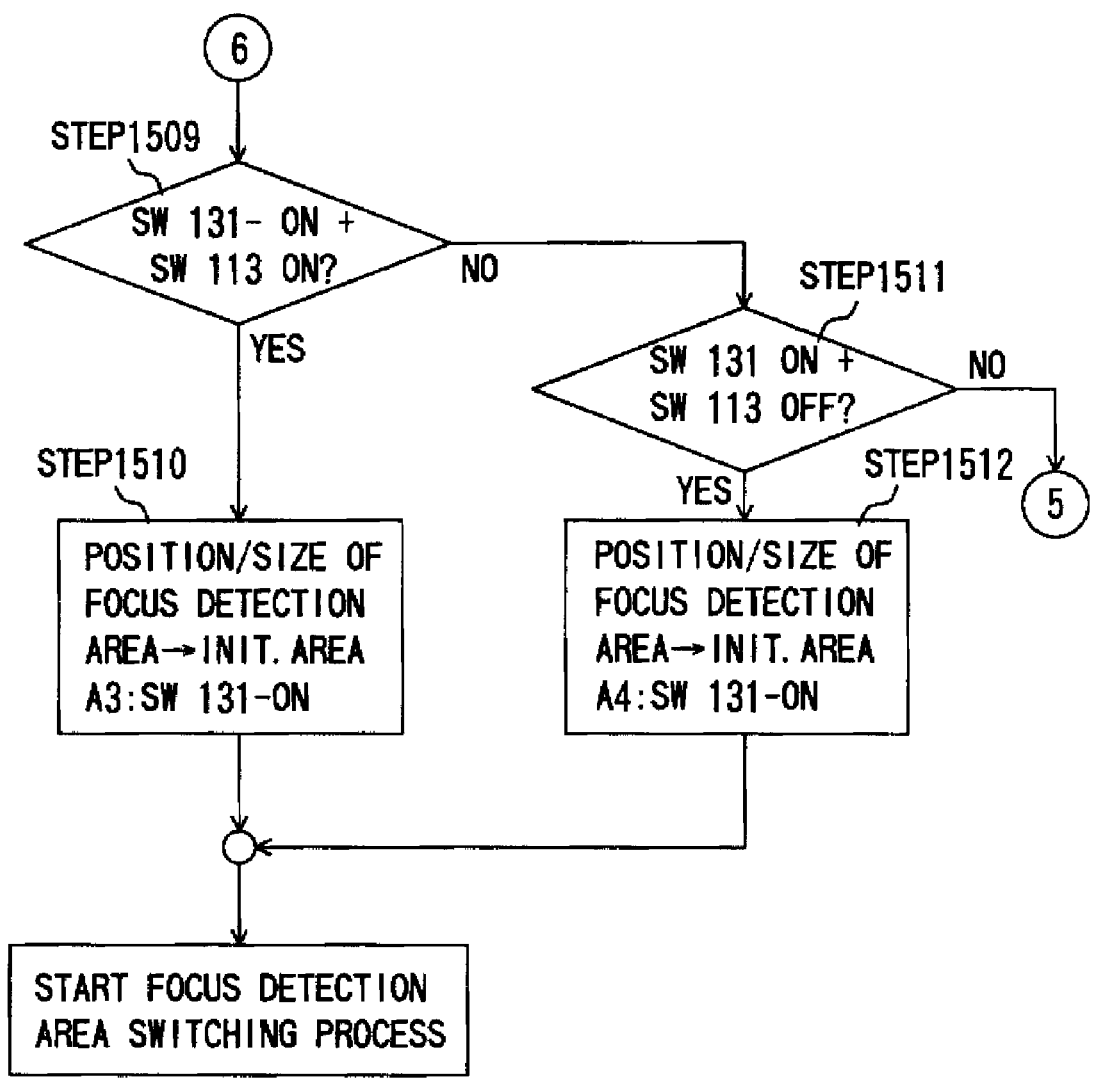
FIG. 31 is a flowchart showing the focus detection area storage process in Embodiment 9.

FIGS. 30 and 31 are flowcharts showing the procedure of the process for storing the focus detection area carried out by the CPU 6. It should be noted that in both figures, like circled numbers denote portions at which the flowcharts are connected together.

In FIG. 30, steps 1501 to 1506 and 1508 perform similar processing as steps 901 to 906 and 908 in FIG. 22 of Embodiment 6, so that they are not explained further.

At step 1507, if the area selection switch 113 is not off while the area determination switch 114 is on, then the procedure advances to step 1509.

If, at step 1509, the area selection switch 113 is on while the initial area determination switch 131 is on, then the procedure advances to step 1510, and the size and the position of the focus detection area at that time is assigned as the initial area A3 to the on state of the area selection switch 113 and stored in the memory 9.

If, at step 1509, the area selection switch 113 is not on while the initial area determination switch 131 is on, then the procedure advances to step 1511.

If, at step 1511, the initial area determination switch 131 is on while the area selection switch 113 is off, then the procedure advances to step 1512, and the size and the position of the focus detection area at that time is assigned as the initial area A4 to the off state of the area selection switch 113 and stored in the memory 9.

If, at step 1511, the area selection switch 113 is not off, then the procedure returns to step 1501. Following steps 1510 and 1512, the procedure advances to the focus detection area switching process shown in FIG. 32.

The procedure of the focus detection area switching process for the various blocks is similar to that in Embodiment 6, so that it is not explained further.

Figure 32:
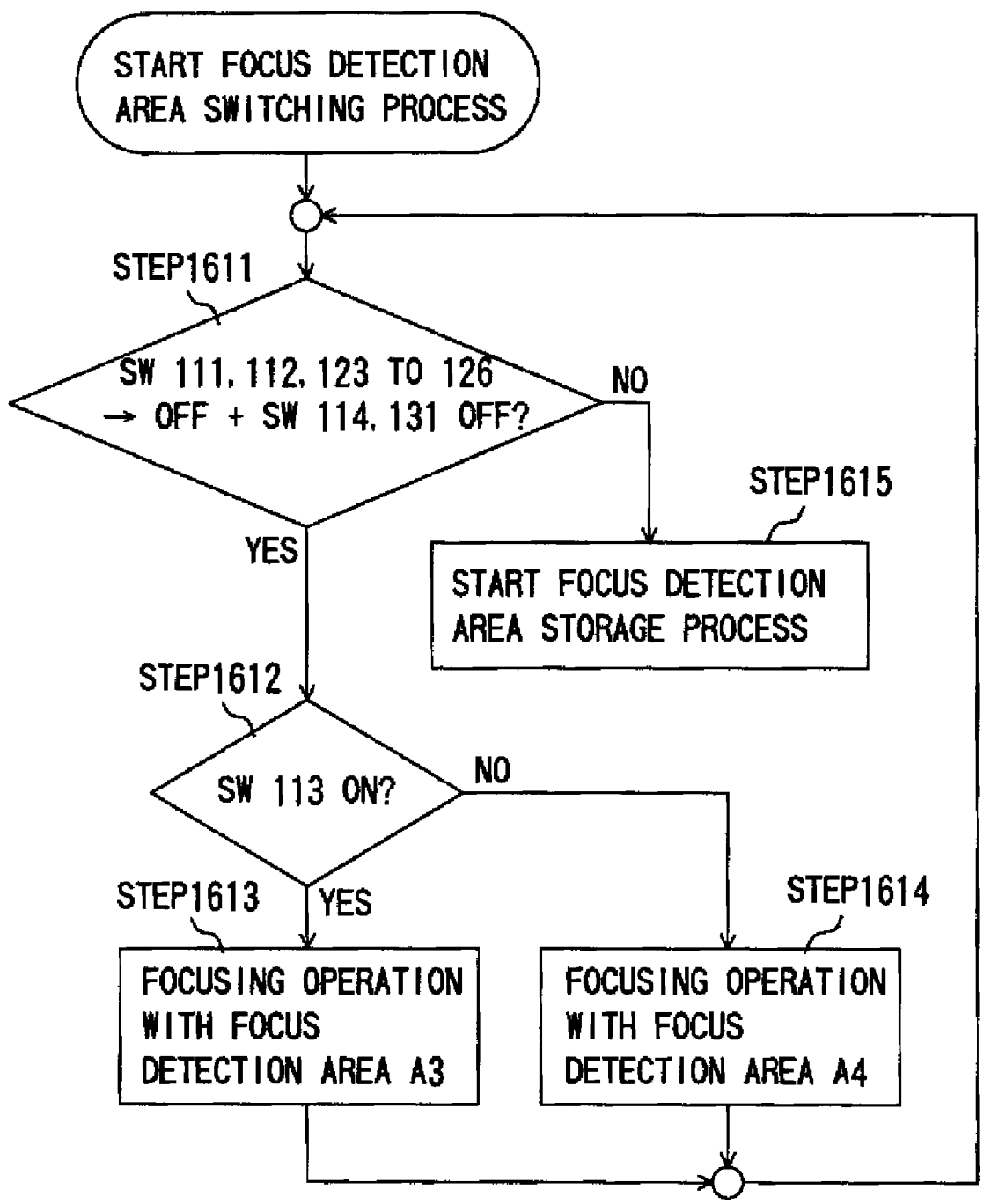
FIG. 32 is a flowchart showing the focus detection area switching process in Embodiment 9.
Figure 33:
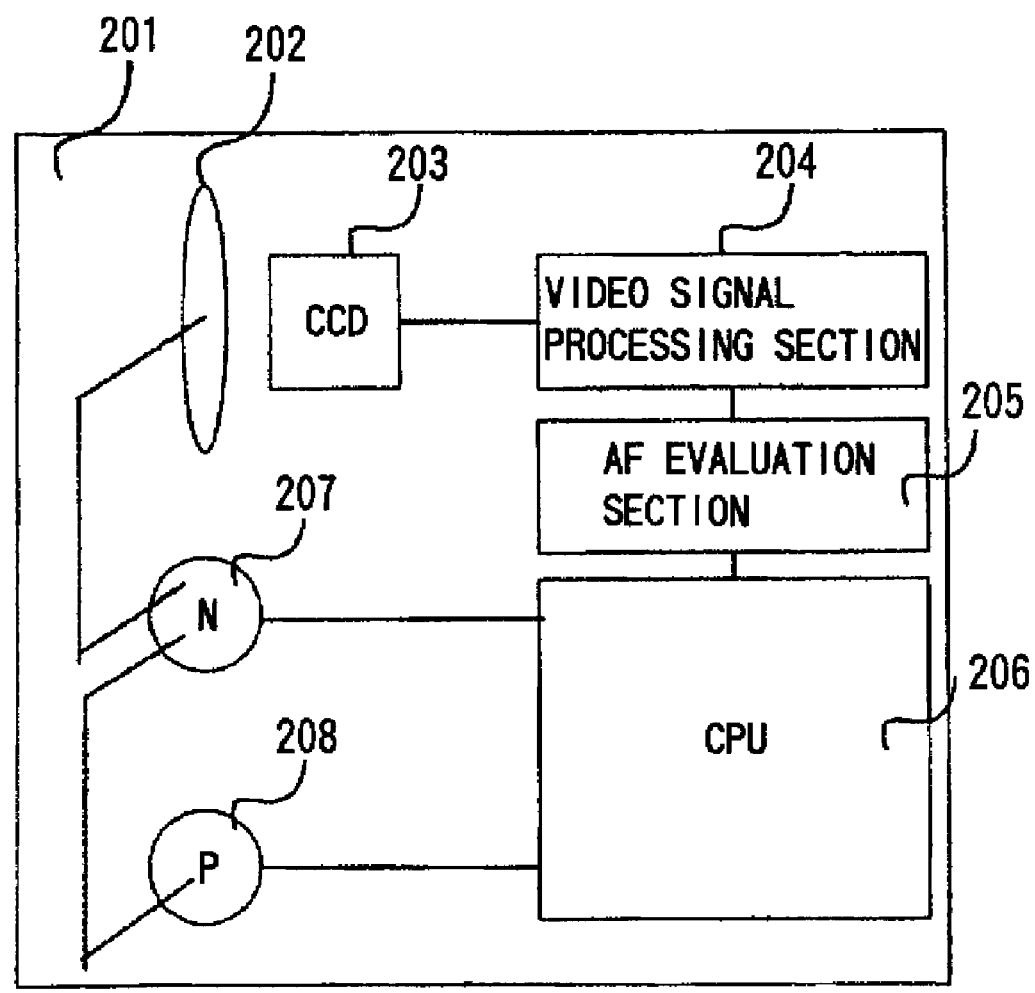
FIG. 33 is a block diagram showing the configuration of a conventional optical apparatus.

FIG. 32 is a flowchart of the procedure of the focus detection area switching process executed by the CPU 6. Steps 1612 to 1614 in FIG. 32 are similar to steps 1002 to 1004 shown in FIG. 23 of Embodiment 6.

If, at step 1611, the size setting switches 111 and 112 and the area shifting switches 123 to 126 are all off, and the area determination switch 114 is not off, then the procedure advances to the storage process shown in FIGS. 30 and 31 (step 1615). At steps 1612 to 1614, a focusing process is performed with respect to the focus detection areas A3 or A4, depending on whether the area selection switch 113 is on or off.

In this embodiment, the size and the position of the focus detection area can be stored and switched, but it is also possible to make only the size of the focus detection area storable and switchable, as in Embodiment 5. Moreover, as in Embodiments 7 and 8, it is also possible to make the focus detection areas A3 or A4 automatically storable. Also, the size and position of the initial area for power-on may be set to the focus detection area A3 or the focus detection area A4 stored in the focus detection area storage process.

Moreover, in this embodiment, the focusing process continues constantly while the area selection switch 113 is on or off, but it is also possible to fix the focus lens 2 after performing the focusing process once, for only the on state of the area selection switch 113. It is further possible to fix the focus lens 2 after performing the focusing process once, for only the off state of the area selection switch 113. It is also possible to fix the focus lens 2 after performing the focusing process once, for the on and the off states of the area selection switch 113.

Moreover, the present embodiment has been explained for the case that only one initial area determination switch 131 is provided, but it is also possible to provide one each for the on and off state of the area selection switch 113, respectively.

Employing the above-described structure, the operator can store two suitable focus detection areas of different size and position, and can further store two focus detection areas of different size and position. Then, by assigning two initial areas to the on and off state of the area selection switch 113, it is possible to set the initial area for power-on as desired. Therefore, after power-on, it becomes possible to start the image-taking quickly without setting the focus detection area or with few control operations.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:
1. A camera comprising:
a focus detection unit detecting a focus state of an image-taking optical system with respect to an object included in a focus detection area;
a first operating member which is operated for changing at least one of a size and a position of the focus detection area;
a memory storing a plurality of focus detection areas which differ from each other in at least one of size and position;
a controller performing a storage process of storing the plurality of focus detection areas into the memory and a setting process of setting, from the stored plurality of focus detection areas, a focus detection area used for detection of the focus state;

an initial area determination member wherein the controller, in response to an operation of the initial area determination member, assigns at least one of the stored plurality of focus detection areas as an initial focus detection area set in accordance with a power-on of the apparatus; and a fourth operating member, wherein the controller, in response to an operation of the fourth operating member, selects the initial focus detection area as the focus detection area.

2. The optical apparatus according to claim 1, further comprising:

a second operating member, which can switch between a first state and a second state, wherein the controller stores a focus detection area of the first state and a focus detection area of the second state in the memory in association with the respective states; and wherein the controller sets, from the focus detection areas stored in the memory, the focus detection area associated with the state of the second operating member as the focus detection area.

3. The optical apparatus according to claim 1, further comprising:

a second operating member, which can switch between a first state and a second state; and a third operating member, wherein the controller, in response to a first operation of the third operating member, stores a focus detection area at the time of the first operation in association with the first state in the memory, and stores a focus detection area while the third operating member is not operated in association with the second state in the memory; and wherein the controller sets, after storing into the memory, the focus detection area associated with the state of the second operating member as the focus detection area.

* * * * *